United States Patent
Gorokhov et al.

(10) Patent No.: US 9,225,416 B2
(45) Date of Patent: Dec. 29, 2015

(54) VARIED SIGNALING CHANNELS FOR A REVERSE LINK IN A WIRELESS COMMUNICATION SYSTEM

(75) Inventors: Alexei Gorokhov, San Diego, CA (US); Aamod Khandekar, San Diego, CA (US); Edward Harrison Teague, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 11/261,806

(22) Filed: Oct. 27, 2005

(65) Prior Publication Data

US 2007/0097942 A1    May 3, 2007

(51) Int. Cl.
*H04J 11/00* (2006.01)
*H04B 7/26* (2006.01)

(52) U.S. Cl.
CPC .................................. *H04B 7/2656* (2013.01)

(58) Field of Classification Search
CPC .... H04L 5/0048; H04B 7/216; H04B 7/0626; H04W 72/0426; H04W 72/042; H04W 24/02; H04W 36/0055; H04W 16/24; H04W 74/0833; H04W 48/10
USPC ......... 370/208, 431, 336, 295, 319, 330, 329; 455/434, 450; 375/130
See application file for complete search history.

(56) References Cited

U.S. PATENT DOCUMENTS

| | | | |
|---|---|---|---|
| 4,393,276 A | 7/1983 | Steele et al. | |
| 4,554,668 A | 11/1985 | Deman et al. | |
| 4,747,137 A | 5/1988 | Matsunaga | |
| 4,783,779 A | 11/1988 | Takahata et al. | |
| 4,783,780 A | 11/1988 | Alexis | |
| 5,008,900 A | 4/1991 | Critchlow et al. | |
| 5,115,248 A | 5/1992 | Roederer et al. | |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

Written Opinion—PCT/US06/060333, International Search Authority—European Patent Office, Apr. 4, 2007.

(Continued)

*Primary Examiner* — Phuoc H Doan
(74) *Attorney, Agent, or Firm* — Dalei Dong

(57) ABSTRACT

Signaling is efficiently sent on a configurable CDMA control segment. To send signaling, transmission parameters for the CDMA control segment for a serving sector are determined. These parameter may indicate the CDMA control segment size, the frames in which the CDMA control segment is sent, the signaling channels to be sent on the CDMA control segment, and so on. The enabled CDMA signaling channels for a terminal and the average transmission interval for each enabled CDMA signaling channel are determined. For each frame in which the CDMA control segment is sent, the signaling channels to be sent on the CDMA control segment in that frame are determined. The signaling for each signaling channel is processed (e.g., encoded, channelized, scaled, and scrambled). The processed signaling for all signaling channels is combined and mapped to a time-frequency region used for the CDMA control segment in the frame.

57 Claims, 13 Drawing Sheets

(56) References Cited

U.S. PATENT DOCUMENTS

| | | |
|---|---|---|
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany et al. |
| 5,406,551 A | 4/1995 | Saito et al. |
| 5,410,538 A | 4/1995 | Roche et al. |
| 5,455,839 A | 10/1995 | Eyuboglu et al. |
| 5,465,253 A | 11/1995 | Rahnema |
| 5,491,727 A | 2/1996 | Petit et al. |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousenn et al. |
| 5,684,491 A | 11/1997 | Newman et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang et al. |
| 5,828,650 A | 10/1998 | Malkamaki et al. |
| 5,838,268 A | 11/1998 | Frenkel et al. |
| 5,867,478 A | 2/1999 | Baum et al. |
| 5,870,393 A | 2/1999 | Yano et al. |
| 5,887,023 A | 3/1999 | Mabuchi et al. |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars et al. |
| 5,955,992 A | 9/1999 | Shattil et al. |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dent et al. |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee et al. |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia et al. |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Muitaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous et al. |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 | 1/2004 | Gray et al. |
| 6,678,318 B1 | 1/2004 | Lai et al. |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan et al. |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |

(56) References Cited

U.S. PATENT DOCUMENTS

| | | |
|---|---|---|
| 6,831,943 B1 | 12/2004 | Dabak et al. |
| 6,842,487 B1 | 1/2005 | Larsson |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al |
| 6,934,266 B2 | 8/2005 | Dulin et al. |
| 6,934,275 B1 | 8/2005 | Love et al. |
| 6,934,340 B1 | 8/2005 | Dollard |
| 6,940,842 B2 | 9/2005 | Proctor, Jr. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi et al. |
| 7,209,712 B2 | 4/2007 | Holtzman |
| 7,215,979 B2 | 5/2007 | Nakagawa et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji et al. |
| 7,257,423 B2 | 8/2007 | Iochi et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer et al. |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil et al. |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |

(56) References Cited

U.S. PATENT DOCUMENTS

| | | |
|---|---|---|
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,031,583 B2 | 10/2011 | Classon et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1* | 6/2004 | Tong et al. .......... 370/431 |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0160914 A1 | 8/2004 | Sarkar et al. |

(56) References Cited

U.S. PATENT DOCUMENTS

| | | |
|---|---|---|
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 * | 12/2004 | Borran et al. .................. 375/260 |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0085195 A1 | 4/2005 | Tong et al. |
| 2005/0085236 A1 | 4/2005 | Gerlach et al. |
| 2005/0111397 A1 * | 5/2005 | Attar et al. .................... 370/319 |
| 2005/0113100 A1 | 5/2005 | Oprescu-Surcobe et al. |
| 2005/0122898 A1 | 6/2005 | Jang et al. |
| 2005/0128983 A1 | 6/2005 | Kim et al. |
| 2005/0135498 A1 | 6/2005 | Yee |
| 2005/0141624 A1 | 6/2005 | Lakshmipathi et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 * | 8/2005 | Wang et al. .................... 370/208 |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 * | 9/2005 | Krishnan et al. .............. 455/434 |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039500 A1 | 2/2006 | Yun et al. |
| 2006/0040655 A1 | 2/2006 | Kim et al. |
| 2006/0056340 A1 | 3/2006 | Hottinen et al. |
| 2006/0057958 A1 | 3/2006 | Ngo et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 * | 6/2006 | Ro et al. ........................ 370/208 |
| 2006/0133269 A1 | 6/2006 | Prakash et al. |
| 2006/0133455 A1 | 6/2006 | Agrawal et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |

(56) References Cited

U.S. PATENT DOCUMENTS

| | | |
|---|---|---|
| 2006/0218459 A1 | 9/2006 | Hedberg |
| 2006/0223449 A1 | 10/2006 | Sampath et al. |
| 2006/0233124 A1 | 10/2006 | Palanki et al. |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286982 A1 | 12/2006 | Prakash et al. |
| 2006/0286995 A1 | 12/2006 | Onggosanusi et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulsonn et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097922 A1 | 5/2007 | Parekh et al. |
| 2007/0097927 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1* | 7/2007 | Palanki et al. ............... 375/132 |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183386 A1 | 8/2007 | Muharemovicc et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Hoo et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlikk et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerterr et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2540688 | 5/2005 |
| CA | 2577369 A1 | 3/2006 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 15212006 | 3/2007 |
| CL | 14922006 | 4/2007 |
| CL | 14892006 | 5/2007 |
| CL | 14902006 | 5/2007 |
| CL | 46151 | 12/2009 |
| CL | 29072006 | 1/2010 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 A | 7/2005 |
| DE | 19800653 | 7/1999 |
| DE | 19800953 C1 | 7/1999 |
| DE | 19957288 | 5/2001 |
| DE | 10240138 | 8/2003 |
| DE | 10254384 A1 | 6/2004 |
| EP | 0488976 A2 | 6/1992 |
| EP | 0568291 A2 | 11/1993 |
| EP | 0740431 A1 | 10/1996 |
| EP | 0786889 A1 | 7/1997 |

(56) References Cited

FOREIGN PATENT DOCUMENTS

| | | |
|---|---|---|
| EP | 0805576 A2 | 11/1997 |
| EP | 0807989 A1 | 11/1997 |
| EP | 0844796 | 5/1998 |
| EP | 0981222 A2 | 2/2000 |
| EP | 1001570 A2 | 5/2000 |
| EP | 1047209 A1 | 10/2000 |
| EP | 1061687 | 12/2000 |
| EP | 1091516 A1 | 4/2001 |
| EP | 1093241 A1 | 4/2001 |
| EP | 1148673 A2 | 10/2001 |
| EP | 1172983 A2 | 1/2002 |
| EP | 1180907 A2 | 2/2002 |
| EP | 1187506 A1 | 3/2002 |
| EP | 1204217 | 5/2002 |
| EP | 1255369 A1 | 11/2002 |
| EP | 1267513 A2 | 12/2002 |
| EP | 1074099 B1 | 2/2003 |
| EP | 1286490 | 2/2003 |
| EP | 1335504 A2 | 8/2003 |
| EP | 1351538 A1 | 10/2003 |
| EP | 1376920 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 | 2/2005 |
| EP | 1531575 A2 | 5/2005 |
| EP | 1533950 | 5/2005 |
| EP | 1538863 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 A1 | 1/1987 |
| GB | 2279540 A | 1/1995 |
| GB | 2348776 | 10/2000 |
| GB | 2412541 A | 9/2005 |
| IL | 167573 | 2/2011 |
| IL | 201872 | 5/2012 |
| JP | H04111544 A | 4/1992 |
| JP | 4301931 | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 A | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 A | 12/1998 |
| JP | H11168453 A | 6/1999 |
| JP | 11191756 A | 7/1999 |
| JP | 11196109 A | 7/1999 |
| JP | 11508417 T | 7/1999 |
| JP | 11239155 A | 8/1999 |
| JP | 11298954 A | 10/1999 |
| JP | 11331927 A | 11/1999 |
| JP | 2000022618 A | 1/2000 |
| JP | 2000102065 A | 4/2000 |
| JP | 2000184425 A | 6/2000 |
| JP | 2000511750 A | 9/2000 |
| JP | 2000332724 A | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 | 11/2001 |
| JP | 2001526012 T | 12/2001 |
| JP | 2002026790 A | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507151 A | 3/2004 |
| JP | 2004507950 A | 3/2004 |
| JP | 2004153676 A | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 A | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 T | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2006524930 A | 11/2006 |
| JP | 2007500486 A | 1/2007 |
| JP | 2007503790 | 2/2007 |
| JP | 2007519281 | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 11/1998 |
| KR | 20000060428 | 10/2000 |

(56) References Cited

FOREIGN PATENT DOCUMENTS

| | | |
|---|---|---|
| KR | 100291476 B1 | 3/2001 |
| KR | 20010056333 | 4/2001 |
| KR | 20010087715 A | 9/2001 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063626 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 | 8/2004 |
| RU | 2237379 C2 | 9/2004 |
| RU | 2238611 C1 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 B | 11/2002 |
| TW | 510132 | 11/2002 |
| TW | 200302642 | 8/2003 |
| TW | 200401572 | 1/2004 |
| TW | I224932 B | 12/2004 |
| TW | I232040 | 5/2005 |
| TW | 248266 | 1/2006 |
| TW | 200718128 | 5/2007 |
| WO | WO9408432 A1 | 4/1994 |
| WO | WO-9521494 A1 | 8/1995 |
| WO | WO9613920 A1 | 5/1996 |
| WO | WO9701256 | 1/1997 |
| WO | WO9737456 A2 | 10/1997 |
| WO | WO-9746033 A2 | 12/1997 |
| WO | WO-9800946 A2 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO-9941871 A1 | 8/1999 |
| WO | WO-9944313 A1 | 9/1999 |
| WO | WO-9944383 A1 | 9/1999 |
| WO | WO-9952250 A1 | 10/1999 |
| WO | WO9953713 | 10/1999 |
| WO | WO-9959265 A1 | 11/1999 |
| WO | WO0002397 | 1/2000 |
| WO | WO-0004728 | 1/2000 |
| WO | WO0033503 | 6/2000 |
| WO | WO-0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO-0139523 A2 | 5/2001 |
| WO | WO0145300 | 6/2001 |
| WO | WO0148969 | 7/2001 |
| WO | WO-0158054 A1 | 8/2001 |
| WO | WO-0160106 A1 | 8/2001 |
| WO | WO-0165637 A2 | 9/2001 |
| WO | WO0169814 A1 | 9/2001 |
| WO | WO0182543 A2 | 11/2001 |
| WO | WO0182544 | 11/2001 |
| WO | WO-0189112 A1 | 11/2001 |
| WO | WO0193505 | 12/2001 |
| WO | WO-0195427 A2 | 12/2001 |
| WO | WO-0204936 A1 | 1/2002 |
| WO | WO0207375 | 1/2002 |
| WO | WO-0215432 A1 | 2/2002 |
| WO | WO0215616 | 2/2002 |
| WO | WO0219746 | 3/2002 |
| WO | WO-0231991 A2 | 4/2002 |
| WO | WO-0233848 A2 | 4/2002 |
| WO | WO-0245293 A2 | 6/2002 |
| WO | WO0245456 A1 | 6/2002 |
| WO | WO0249305 | 6/2002 |
| WO | WO0249306 | 6/2002 |
| WO | WO0249385 A2 | 6/2002 |
| WO | WO02060138 A2 | 8/2002 |
| WO | WO02065675 | 8/2002 |
| WO | WO02082689 A2 | 10/2002 |
| WO | WO02082743 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | WO03001696 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | WO-03049409 A2 | 6/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | 2004002011 | 12/2003 |
| WO | WO03103331 | 12/2003 |
| WO | WO2004002047 A1 | 12/2003 |
| WO | WO2004004370 | 1/2004 |
| WO | WO2004008671 | 1/2004 |
| WO | WO-2004008681 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | WO-2004028037 A1 | 4/2004 |
| WO | WO-2004030238 A1 | 4/2004 |
| WO | WO-2004032443 A1 | 4/2004 |
| WO | 2004040827 A2 | 5/2004 |
| WO | WO2004038954 | 5/2004 |
| WO | WO-2004038972 A1 | 5/2004 |
| WO | WO-2004038984 A2 | 5/2004 |
| WO | WO-2004038988 A2 | 5/2004 |
| WO | WO-2004040690 A2 | 5/2004 |
| WO | WO2004047354 A1 | 6/2004 |
| WO | WO2004049618 A1 | 6/2004 |
| WO | WO-2004051872 A2 | 6/2004 |
| WO | WO-2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |

(56) References Cited

FOREIGN PATENT DOCUMENTS

| | | |
|---|---|---|
| WO | WO2004068721 A2 | 8/2004 |
| WO | WO-2004073276 A1 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO-2004086706 A1 | 10/2004 |
| WO | WO2004086711 | 10/2004 |
| WO | 2004098072 | 11/2004 |
| WO | WO2004095730 A1 | 11/2004 |
| WO | WO2004095851 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | WO2004105272 A1 | 12/2004 |
| WO | WO2004114549 | 12/2004 |
| WO | WO-2004114615 A1 | 12/2004 |
| WO | WO2005011163 A1 | 2/2005 |
| WO | WO-2005015795 A1 | 2/2005 |
| WO | WO-2005015797 A1 | 2/2005 |
| WO | WO2005015810 | 2/2005 |
| WO | WO2005015941 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | WO-2005043780 A1 | 5/2005 |
| WO | WO2005043855 | 5/2005 |
| WO | WO2005046080 A1 | 5/2005 |
| WO | 2005055527 A1 | 6/2005 |
| WO | WO-2005055465 A1 | 6/2005 |
| WO | WO2005055484 A1 | 6/2005 |
| WO | WO2005060192 A1 | 6/2005 |
| WO | WO2005065062 | 7/2005 |
| WO | WO2005074184 | 8/2005 |
| WO | WO-2005086440 A1 | 9/2005 |
| WO | WO2005069538 | 10/2005 |
| WO | WO-2005096538 A1 | 10/2005 |
| WO | WO2005122628 | 12/2005 |
| WO | 2006007292 A2 | 1/2006 |
| WO | WO2006019710 | 2/2006 |
| WO | WO2006026344 | 3/2006 |
| WO | WO-2006026344 A1 | 3/2006 |
| WO | WO2006044487 | 4/2006 |
| WO | WO-2006062356 A1 | 6/2006 |
| WO | WO2006069300 | 6/2006 |
| WO | WO2006069397 | 6/2006 |
| WO | WO2006077696 | 7/2006 |
| WO | WO-2006096784 A1 | 9/2006 |
| WO | WO-2006099349 A1 | 9/2006 |
| WO | WO-2006099545 A1 | 9/2006 |
| WO | WO-2006099577 A1 | 9/2006 |
| WO | WO-2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | WO-2007022430 A2 | 2/2007 |
| WO | WO2007024934 | 3/2007 |
| WO | WO-2007024935 A2 | 3/2007 |
| WO | WO2007025160 | 3/2007 |
| WO | WO-2007051159 A2 | 5/2007 |

OTHER PUBLICATIONS

International Preliminary Report on Patentability—PCT/US06/060333—International Bureau of WIPO—Geneva, Switzerland, Apr. 29, 2008.

Digital cellular telecommunications system (Phase 2+); Mobile radio interface layer 3 specification (version 7..7.1 Release 1998); ETSI EN 300 940 V7.7.7 (Oct. 2000), pp. 1;2,91-93.

Favre et al: "Self-Adaptive Transmission Procedure" IBM Technical Disclosure Bulletin, IBM Corp Sep. 1976, vol. 19, No. 4, pp. 1283-1284, New York, New York.

Groe, et al., "CDMA Mobile Radio Design," Sep. 26, 2001, Artech House, Norwood, MA 020.

Laroia, R. et al: "An integrated approach based on cross layer optimization—Designing a mobile broadband wireless access network" IEEE Signal Processing Magazine. IEEE Service Center, Piscataway, NJ, US, vol. 21, No. 5, Sep. 2004, pp. 20-28, XP011118149.

Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA; New York, New York.

Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).

Tomcik, J.: "QFDD Technology Overview Presentation," IEEE 802.20 Working Group on Mobile Broadband Wireless Access, Slides/pp. 1-73, Nov. 15, 2005.

Tomcik, J.: "MBFDD and MBTDD Wideband Mode: Technology Overview," IEEE 802.20 Working Group Mobile Broadband Wireless Access, Jan. 2006, pp. 1-109, XP002429968.

Toufik I et al., "Channel allocation algorithms for multi-carrier systems", Vehicular Technology Conference, 2004. VTC2004-FALL. 2004 IEEE 60TH Los Angeles, CA, USA Sep. 26-29, 2004, pp. 1129-1133, XP010786798, ISBN: 07-7803-8521-7.

TIA-1121.001 "Physical Layer for Ultra Mobile Broadband (UMB) Air Interface Specification," 3GPP2 C.S0084-001-0, Version 2.0 (Aug. 2007).

TIA-1121.002 "Medium Access Control Layer for Ultra Mobile Broadband (UMB) Air Interface Specification," 3GPP2 C.S0084-002-0, Version 2.0 (Aug. 2007).

Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.

International Search Report—PCT/US06/060333, International Search Authority—European Patent Office, Apr. 4, 2007.

3rd Generation Partnership Project; Technical Specification Group Radio Access Network; Physical Layer Aspects for Evolved UTRA (Release 7), 3GPP TR 25.814 v0.3.1 (Nov. 2005).

B. Sklar: "The process of thus correcting the channel-induced distortion is called equalization", Digital Communications, PTR Prentice Hallt, Upper Saddle River, New Jersey, 1998, Formatting and Baseband Transmission, Chap. 2, Section 2.11.2, pp. 104-105.

Bahal: Saltzberg: "System Architecture," Multi-Carrier Digital Communications, Kluwer Academic, New York, NY, XP-002199501, 1999, pp. 17-21.

Bingham: "Other Types of MCM," ADSL, VDSL, and Multicarrier Modulation, John wiley & Sons, New York, XP-00219502, 2000, pp. 111-113.

Carl R. Nassar, Balasubramaniam Natarajan and Steve Shattil; Introduction of Carrier Interference to Spread Spectrum Multiple Access, Apr. 1999, IEEE, pp. 1-5.

Chennakeshu, et al. "A Comparison of Diversity Schemes for a Mixed-Mode Slow Frequency-Hopped Cellular System," IEEE, 1993, pp. 1749-1753.

Chennakeshu, et al. "Capacity Analysis of a TDMA-Based Slow-Frequency-Hopped Cellular System," IEEE: Transaction on Vehicular Technology, vol. 45., No. 3 Aug. 1996, pp. 531-542.

Chiani, et al. "Outage Evaluation for Slow Frequency-Hopping Mobile Radio Systems" IEEE Transactions on vol. 47, No. 12, pp. 1865-1874, Dec. 1999.

Choi, et al., "Design of the Optimum Pilot Pattern for Channel Estimation in OFDM Systems," Global Telecommunications Conference, IEEE Communications Society, Globecom, Dallas, Texas (2004), p. 3661-3665.

(56) References Cited

OTHER PUBLICATIONS

CZYLWIK: "Comparison Between Adaptive OFDM and Single Carrier Modulation with Frequency Domain Equalization," IEEE 47th Vehicular Technology Conference, vol. 2, May 4-7, 1997. pp. 865-869.
Das, et al. "On the Reverse Link Interference Structure for Next Generation Cellular Systems," European Microwave Conference, Oct. 11, 2004, pp. 3068-3072.
Dinis, et al., "A Multipie Access Scheme for the Uplink of Broadband Wireless Systems," IEEE Global Telecommunications Conference, 2004. GLOBECOM '04, vol. 6, Nov. 29 Dec. 3, 2004, pp. 3808-3812.
Fuchs, et al., "A Novel Tree-Based Scheduling-Algorithm for the Downlink of Multi-User MIMO Systems with ZF Beamforming," IEEE International Conference on Acoustics, Speech, and Signal Processing: 2005, Proceedings, Philadelphia, PA, pp. 1121-1124.
Hermann Rohling et al., "Performance Comparison of Different Multiple Access Schemes for the Downlink of an OFDM Communication System", Vehicular Technology Conference, 1997, 47th IEEE, vol. 3, May 4-7, 1997, pp. 1366-1369.
Hill, et al., "Cyclic Shifting and Time Inversion of Partial Transmit Sequences to Reduce the Peak-to-Average Power Ratio in OFDM," IEEE International Symposium on Personal, Indoor and mobile Radio Communications, vol. 2, Sep. 18, 2000, Piscataway, NJ, pp. 1256-1259.
J.S. Chow and J.M. CIOFFI: "A cost-effective maximum likelihood reciever for multicarrier systems", Proc. IEEE Int. Conf. on Comm., pp. 948-952, Jun. 1992.
Je et al. "A Novel Multiple Access Scheme for Uplink Cellular Systems," IEEE Vehicular Technology Conference, Sep. 26, 2004 pp. 984-988.
John S. Groe, Lawrence E. Larson, "CDMA Mobile Radio Design" Sep. 26, 2001, Artech House, Norwood, MA02062 580530, XP002397967, pp. 157-159.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S-1, "Programmable Demultiplexer/Demodulator Processor," COMSAT Laboratories, IEEE, 1990, pp. 230-234.
Karsten Bruninghaus et al., : "Multi-Carrier Spread Spectrurn and It's relationship to Single-Carrier Transmission", Vehicular technology Conference, 1998, VTC 98, 48th IEEE, vol. 3, May 18-21, 1998, pp. 2329-2332.
Keller, et al,: "Adaptive Multicarrier Modulation: A Convenient Framework for Time-Frequency Processing in Wireless Communications," Proceedings of the IEEE, vol. 88, No. 5, May 2000, pp. 611-640.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kishiyama Y et al: "Investigation of Optimum Pilot Channel Structure for VSF-OFCDM Broadband Wireless Access in Forward Link". IEEE Vehicular Technology Conference, New York, NY, US, vol. 4, Apr. 22, 2003, p. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Leon, et al., "Cyclic Delay Diversity for Single Carrier-Cyclic Prefix Systems," Conference Record of the Thirty-Ninth Asilomar Conference on Signals, Systems and Computers. Oct. 28, 2005, Piscataway, NJ, pp. 519-523.

Lott: "Comparison of Frequency and Time Domain Differential Modulation in an OFDM System for Wireless ATM," 1999 IEEE 49th Vehicular Technology Conference, vol. 2, Jul. 1999, pp. 577-883.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications; vol. 45, No. 8, Aug. 1997.
Naofal Al-Dhahir: "Optimum Finite-Length Equalization for Multicarrier Transceivers", IEEE Trans, On Comm., pp. 56-64, Jan. 1996.
Nassar, Carl R. et al., "High-Performance MC-CDMA via Carrier Interferometry Codes", IEEE Transactions on Vehicular Technology, vol. 50. No. 6, Nov. 2001.
NTT DoCoMo, et al.: "Orthogonal Common Pilot Channel and Scrambling Code in Evolved Utra Downlink," 3GPP TSG RAN WG1 #42 on LTE, pp. 1-8 (Aug.-Sep. 2005).
Sari, et al. "Transmission Technques for Digital Terrestrial TV Broadcasting." IEEE Comrnunications Magazine, Feb. 1995, pp. 100-109.
Schnell, et al. "Application of IFDMA to Mobile Radio Transmission," IEEE 1998 International Conference on Universal Personal Communications, vol. 2, Oct. 5-9, 1998, pp. 1267-1272.
Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.
Shattil et al. "Array Control Systems for Multicarrier Protocols Using a Frequency-Shifted Feedback Cavity", IEEE, 1999.
Sklar: "Formatting and Baseband Transmission", Chapter 2, pp. 54, 104-106.
Sorger U. et al., "Interleave FDMA-a new spread-spectrum multiple-access scheme", IEEE Int. Conference on Atlanta, GA, USA Jun. 7-11, 1998, XP010284733.
Tellado, "Muiticarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33. No. 15, Jul. 17, 1997, pp. 1300-1301.
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
Torrieri, "Cellular Frequency-Hopping CDMA Systems," IEEE Vehicular Technology Conference, May 16, 1999, pp. 919-925.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, 1999, Jul. 6-8, 1999, pp. 362-368.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Voltz, P.J.,"Characterization of the optimum transmitter correlation matrix for MIMO with antenna subset selection", IEEE Transactions on Communications, vol. 51, No. 11, pp. 1779-1782, (Nov. 1, 2003).
European Search Report—EP10011743, Search Authority—Munich Patent Office, Dec. 20, 2010.
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.

(56) References Cited

OTHER PUBLICATIONS

Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.
Tomcik, T.: "QTDD Performance Report 2," IEEE C802.20-05/88, IEEE 802.20 Working Group on Mobile Broadband Wireless Access, <http://ieee802.org/20/>, pp. 1-56 XP002386798, (Nov. 15, 2005).
Translation of Office Action in Chinese Application 2006800295980 corresponding to U.S. Appl. No. 11/260,895, dated Feb. 16, 2011.
Translation of Office Action in Japan application 2008-538193 corresponding to U.S. Appl. No. 11/261,065, dated Mar. 8, 2011.
Translation of Office Action in Korean application 10-2007-7031029 corresponding to U.S. Appl. No. 11/260,931, dated Jan. 28, 2011.
Translation of Office Action in Canadian application 2625987 corresponding to U.S. Appl. No. 11/261,065, dated Apr. 12, 2011.
Translation of Office Action in Chinese application 200680040236.1 corresponding to U.S. Appl. No. 11/261,065, dated Feb. 18, 2011.
Translation of Office Action in Chinese application 200680048265.2 corresponding to U.S. Appl. No. 11/260,931, dated Jan. 26, 2011.
Translation of Office Action in Chinese application 200680048832.4 corresponding to U.S. Appl. No. 11/261,158, dated Dec. 31, 2010.
Translation of Office Action in Japanese Application 2008-514880 corresponding to U.S. Appl. No. 11/445,377, dated Nov. 9, 2010.
Translation of Office Action in Japanese application 2008-528103 corresponding to U.S. Appl. No. 11/260,924, dated Feb. 8, 2011.
Translation of Office Action in Japanese Application 2008-529216 corresponding to U.S. Appl. No. 11/261,159, Dated Jan. 11, 2011.
Translation of Office Action in Japanese application 2008-538181 corresponding to U.S. Appl. No. 11/511,735, dated Jan. 25, 2011.
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.
3GPP TS 33.220 V.1.1.0, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
Blum et al, "On Optimum MIMO with antenna selection," IEEE International Conference on Communications: Conference Proceedings, vol. 1, Apr. 28, 2002, pp. 386-390.
Catreux, S. et al.: "Simulation results for an interference-limited multiple input multiple output cellular system"., Global Telecommunications Conference, 2000, GLOBECOM '00. IEEE. Dec. 1, 2000. vol. 2, pp. 1094-1096 http://ieeexplore.ieee.org/iel5/7153/19260/ 00891306.pdf?tp=&isnumber=19260&arnumber=8913063 &punumber=7153.
Chiani, et al. "Outage Evaluation for Slow Frequency-Hopping Mobile Radio Systems" IEEE Transactions on Communications, vol. 47, No. 12, Dec. 1999, pp. 1865-1874.
Chung, S. et al.: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
Dierks, et al., "The TLS Protocol", Version 1.0, Network Working Group, Request for Comments 2246, pp. 1-80 (Jan. 1999).
El Gamal, et al.: "Universal Space-Time Coding," IEEE Transactions on Information Theory, vol. 49, Issue 5, pp. 1097-1119, XP011074756, ISSN: 0018-9448, May 2003.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, 1997.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; 650, Route Des Lucioles; F-06921 Sophia-Antipolis Cedex; France, vol. RAN WG1, no. San Diego, USA; Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Schnell et al., "Application of IFDMA to Mobile Radio Transmission", IEEE 1998 International Conference on Universal Personal Communications, vol. 2, Oct. 5-9, 1998, pp. 1267-1272.
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Siemens, Evolved UTRA uplink scheduling and frequency reuse[online], 3GPP TSG-RAN WG1 # 41 R1-050476, Internet <URL:http://www.3gpp.org/ftp/tsg_ran/WG1_RL1/TSGR1_41/ Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Ken Murakami et al., "Status Toward Standardization at IEEE 802. 3ah and Challenge to System Architecture," Technical Report of the Institute of Electronics, Information and Communication Engineers, Jun. 13, 2003, vol. 103, No. 124, pp. 1-6, IN2003-24.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105640 [retrieved on Apr. 3, 2007].
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Physical Channels and Multiplexing in Evolved UTRA Downlink TSG-RAN Working Group 1 Meeting, vol. RI-050590, Jun. 20, 2005, pp. 1-24, XP003006923 the whole document.

(56) References Cited

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Nokia: "Compact signalling of multi-code allocation for HSDPA", version 2, 3GPP R1-02-0018, Jan. 11, 2002.
Samsung: "Uplink Transmission and Multiplexing for EUTRA", 3GPP Draft; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Bhushan N., "UHDR Overview", C30-20060522-037, Denver, CO, May 22, 2006, pp. 1-115.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola, "Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Feb. 7, 2012].
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6, 1-7, 1-16, 6-65, 7-11, 7-33, 7-37-7-55, 9-21, 9-22, 9-24-9-32.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

* cited by examiner

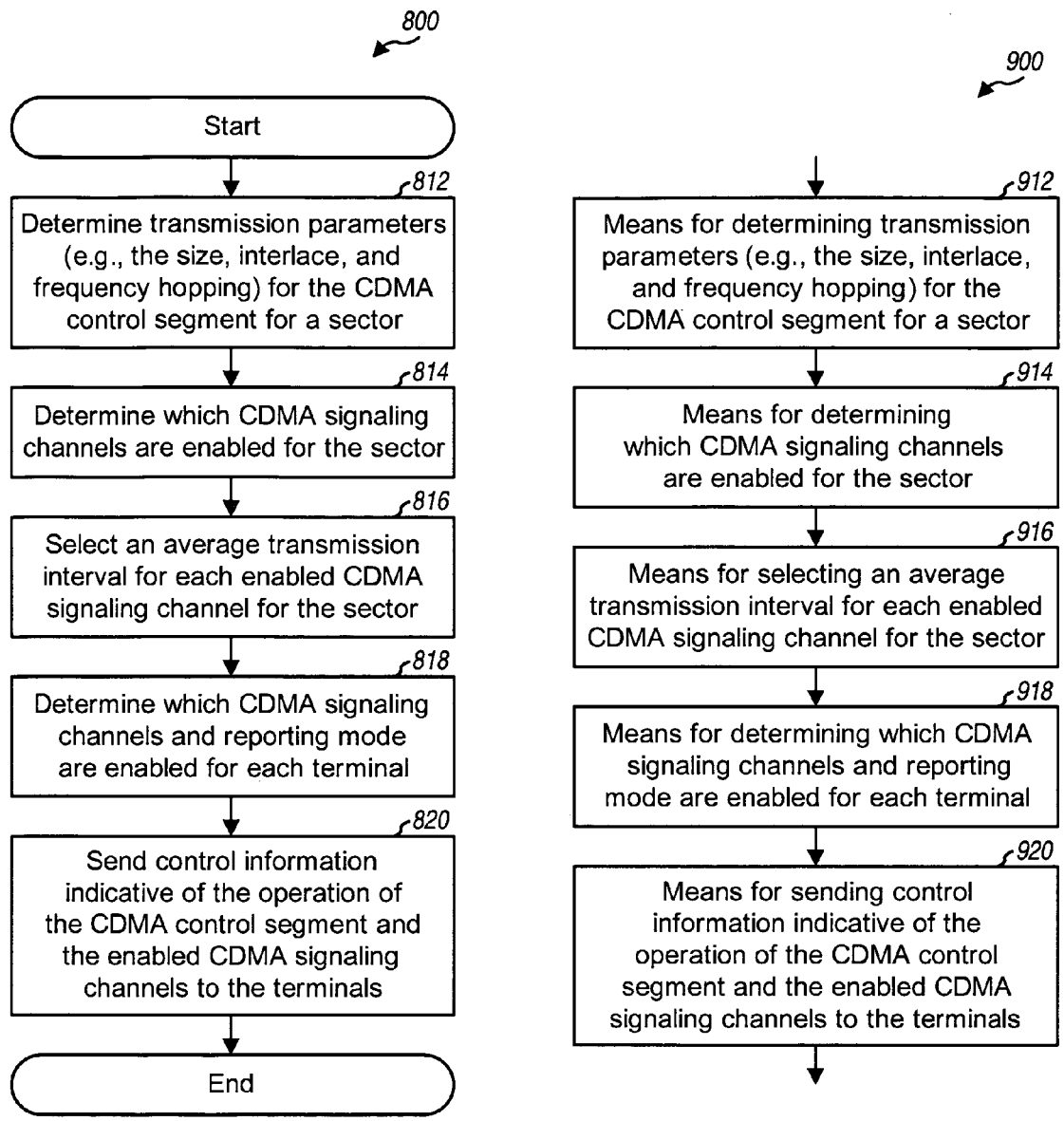

VARIED SIGNALING CHANNELS FOR A REVERSE LINK IN A WIRELESS COMMUNICATION SYSTEM

REFERENCE TO CO-PENDING APPLICATIONS FOR PATENT

The present application for patent claims priority to Provisional Application Serial No. 60/756,947, entitled "REVERSE LINK REPORTING FOR VARYING REVERSE LINK SIGNALING CHANNELS FOR IN A WIRELESS COMMUNICATION SYSTEM," filed Jan. 5, 2006, assigned to the assignee hereof and hereby expressly incorporated by reference herein.

The present Application for Patent is related to the following co-pending U.S. Patent Applications:

U.S. patent application Ser. No. 11/261,836; filed Oct. 27, 2005, entitled "SYSTEMS AND METHODS FOR Control Channel Signaling CONTROL CHANNEL SIGNALING," filed concurrently herewith, assigned to the assignee hereof, and expressly incorporated by reference herein; and U.S. patent application Ser. No. 60/731,013, filed on Oct. 27, 2005, entitled "MOBILE WIRELESS ACCESS SYSTEM," and U.S. patent application Ser. No. 60/731,126, filed on Oct. 27, 2005, entitled "METHODS AND APPARATUS FOR PROVIDING MOBILE BROADBAND WIRELESS LOWER MAC," filed concurrently herewith, assigned to the assignee hereof, and expressly incorporated by reference herein; and U.S. patent application Ser. No. 60/731,037, filed on Oct. 27, 2005, entitled "METHODS AND APPARATUS FOR PROVIDING MOBILE BROADBAND WIRELESS HIGHER MAC," and U.S. patent application Ser. No. 60/756,947, filed on Jan. 5, 2006, entitled "REVERSE LINK REPORTING FOR VARYING REVERSE LINK SIGNALING CHANNELS FOR IN A WIRELESS COMMUNICATION SYSTEM," filed concurrently herewith, assigned to the assignee hereof, and expressly incorporated by reference herein.

BACKGROUND

I. Field

The present disclosure relates generally to communication, and more specifically to transmission of signaling in a wireless communication system.

II. Background

Wireless communication systems are widely deployed to provide various communication services such as voice, packet data, broadcast, messaging, and so on. These systems may be multiple-access systems capable of supporting communication for multiple users by sharing the available system resources. Examples of such multiple-access systems include code division multiple access (CDMA) systems, time division multiple access (TDMA) systems, and frequency division multiple access (FDMA) systems.

A communication system typically utilizes various signaling channels to support data transmission on the forward and reverse links. The forward link (or downlink) refers to the communication link from the base stations to the terminals, and the reverse link (or uplink) refers to the communication link from the terminals to the base stations. For example, the terminals may send signaling on the reverse link to request for data transmission on one or both links, to report channel quality, to request for handoff to stronger base stations, and so on. The signaling sent by the terminals, although beneficial, represent overhead in the system.

There is therefore a need in the art for techniques to efficiently send signaling on the reverse link in a communication system.

SUMMARY

Techniques for efficiently sending signaling on a CDMA control segment on the reverse link of a wireless communication system are described herein. The CDMA control segment has various configurable features. In an embodiment, the size of the CDMA control segment, the frames in which the CDMA control segment is sent, the signaling channels to be sent on the CDMA control segment, and so on, may be configurable. Signaling channels carrying various types of signaling may be sent on the CDMA control segment. A signaling channel may also be called a control channel, a feedback channel, a reporting channel, an overhead channel, and so on.

In an embodiment for transmitting signaling on the CDMA control segment by a terminal, transmission parameters for the CDMA control segment for a serving base station are determined. These parameters may indicate, e.g., the CDMA control segment size, the frames for sending the CDMA control segment, frequency hopping for the CDMA control segment, and so on. The enabled CDMA signaling channels for the terminal and the average transmission interval for each enabled CDMA signaling channel are also determined. For each frame in which the CDMA control segment is sent, the signaling channels to be sent on the CDMA control segment in the frame are determined. The signaling for each signaling channel is processed, e.g., encoded, channelized, scaled, and scrambled. The processed signaling for all signaling channels is combined and mapped to a time-frequency region used for the CDMA control segment in the frame.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 8 and 9 show a process and an apparatus, respectively, for controlling signaling transmission on a CDMA control segment.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
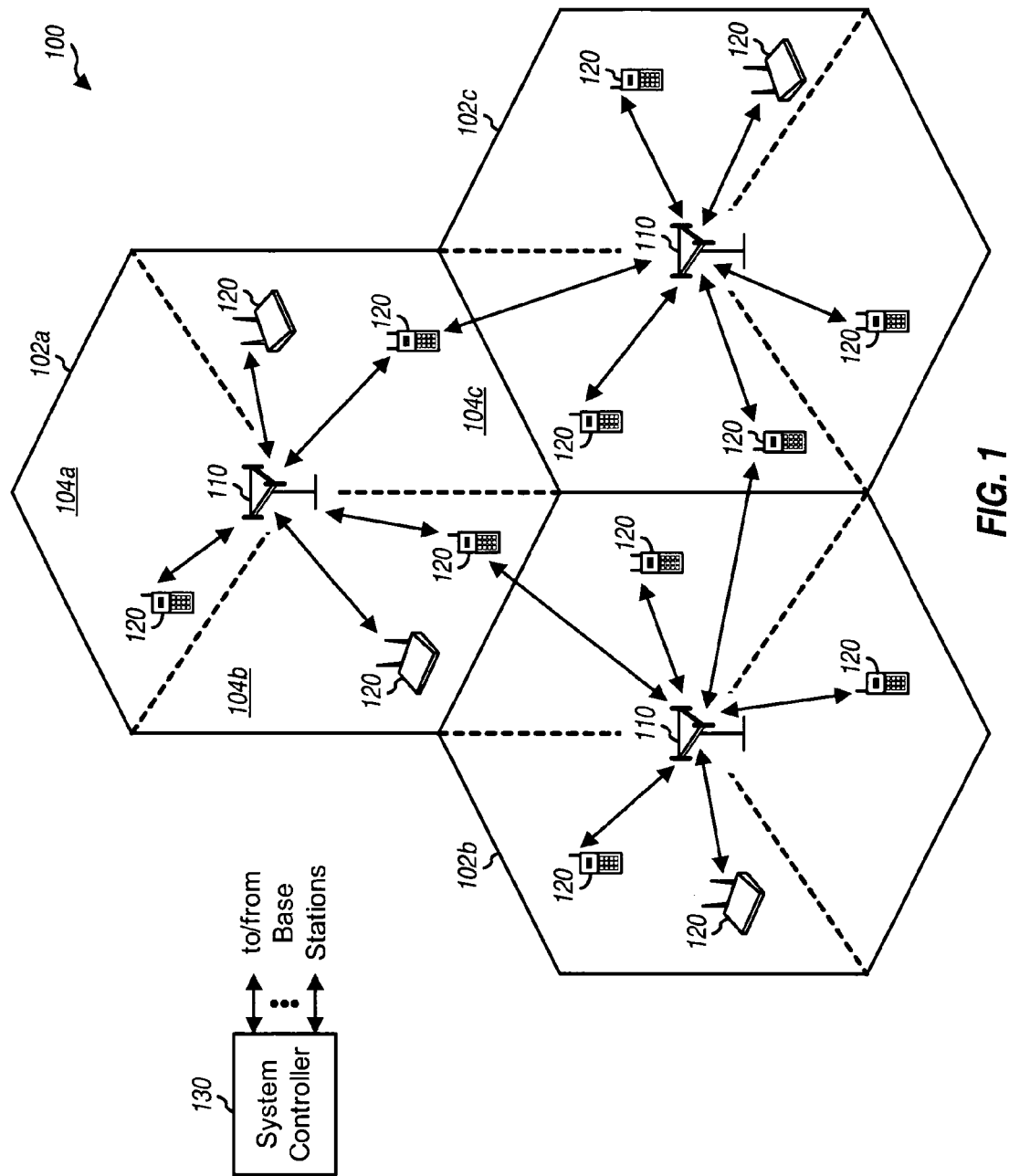
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, and/or some other network entity. Each base station 110 provides communication coverage for a particular geographic area 102a-c. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to base stations 110 and provides coordination and control for these base stations. System controller 130 may be a single network entity or a collection of network entities. For a distributed architecture, the base stations may communicate with one another as needed.

The signaling transmission techniques described herein may be used for a system with sectorized cells as well as a system with un-sectorized cells. For clarity, the techniques are described below for a system with sectorized cells. In the following description, the term "base station" and "sector" are used interchangeably.

The signaling transmission techniques described herein may also be used for various wireless communication systems such as a CDMA system, a TDMA system, an FDMA system, an orthogonal frequency division multiple access (OFDMA) system, a single-carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier may be independently modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

System 100 may use various subcarrier structures for the forward and reverse links. For a distributed subcarrier structure, the K total subcarriers are arranged into S non-overlapping sets such that each set contains N subcarriers that are uniformly distributed across the K total subcarriers. Consecutive subcarriers in each set are spaced apart by S subcarriers, where $K=S \cdot N$. Thus, set s contains subcarriers s, S+s, 2S+s, ..., (N-1)·S+s, for $s \in \{1, \ldots, S\}$. For a block subcarrier structure, the K total subcarriers are arranged into S non-overlapping sets such that each set contains N consecutive subcarriers. Thus, set s contains subcarriers (s-1)·N+1 through s·N, for $s \in \{1, \ldots, S\}$. In general, the subcarrier structure used for each link may include any number of sets, and each set may include any number of subcarriers that may be arranged in any manner. In an embodiment that is assumed for much of the description below, the distributed or block subcarrier structure is used for the forward link, and the block subcarrier structure is used for the reverse link.

System 100 may support a single carrier or multiple carriers for each link. In an embodiment, multiple (C) subcarriers are available for each carrier supported by the system. Each carrier may also be partitioned into multiple (P) subbands. A subband is a range of frequency within the system bandwidth. In an embodiment, each carrier spans approximately 5 MHz, $C=512$, $P=4$, $S=32$, and $N=16$. For this embodiment, a single-carrier system has $K=512$ total subcarriers that are arranged into four subbands, and each subband includes 128 subcarriers. For this embodiment, the single-carrier system has 32 subcarrier sets, and each set includes 16 subcarriers. For this embodiment, a system with four carriers has $K=2048$ total subcarriers that are arranged into 16 subbands.

On the forward link, a base station may transmit data to one or multiple terminals on the S subcarrier sets using OFDMA or SC-FDMA. For example, the base station may simultaneously transmit data to S different terminals, one subcarrier set per terminal. On the reverse link, one or multiple terminals may transmit data to a base station on the S subcarrier sets using OFDMA or SC-FDMA. For example, each terminal may transmit data on one subcarrier to the base station. For each of the forward and reverse links, the transmissions on the S subcarrier sets are orthogonal to one another. The S subcarrier sets for each link may be allocated to the terminals in various manners, as described below. A base station may also transmit data to multiple terminals and/or receive data from multiple terminals on a given subcarrier set with spatial division multiple access (SDMA).

An OFDM symbol may be generated for one subcarrier set in one symbol period as follows. N modulation symbols are mapped to the N subcarriers in the set and zero symbols with signal value of zero are mapped to the remaining K−N subcarriers. A K-point inverse fast Fourier transform (IFFT) or inverse discrete Fourier transform (IDFT) is performed on the K modulation symbols and zero symbols to obtain a sequence of K time-domain samples. The last C samples of the sequence are copied to the start of the sequence to form an OFDM symbol that contains K+C samples. The C copied samples are often called a cyclic prefix or a guard interval, and C is the cyclic prefix length. The cyclic prefix is used to combat intersymbol interference (ISI) caused by frequency selective fading, which is a frequency response that varies across the system bandwidth.

An SC-FDMA symbol may be generated for one subcarrier set in one symbol period as follows. N modulation symbols to be sent on the N subcarriers in the set are transformed to the frequency domain with an N-point fast Fourier transform (FFT) or discrete Fourier transform (DFT) to obtain N frequency-domain symbols. These N frequency-domain symbols are mapped to the N subcarriers in the set, and zero symbols are mapped to the remaining K−N subcarriers. A K-point IFFT or IDFT is then performed on the K frequency-domain symbols and zero symbols to obtain a sequence of K time-domain samples. The last C samples of the sequence are copied to the start of the sequence to form an SC-FDMA symbol that contains K+C samples.

In general, an OFDM symbol or an SC-FDMA symbol for any number of subcarriers and any combination of subcarriers may be generated in a similar manner by mapping symbols to the subcarriers used for transmission. The K+C samples of an OFDM symbol or an SC-FDMA symbol are transmitted in K+C sample/chip periods. A symbol period is the duration of one OFDM symbol or one SC-FDMA symbol and is equal to K+C sample/chip periods.

Figure 2A:
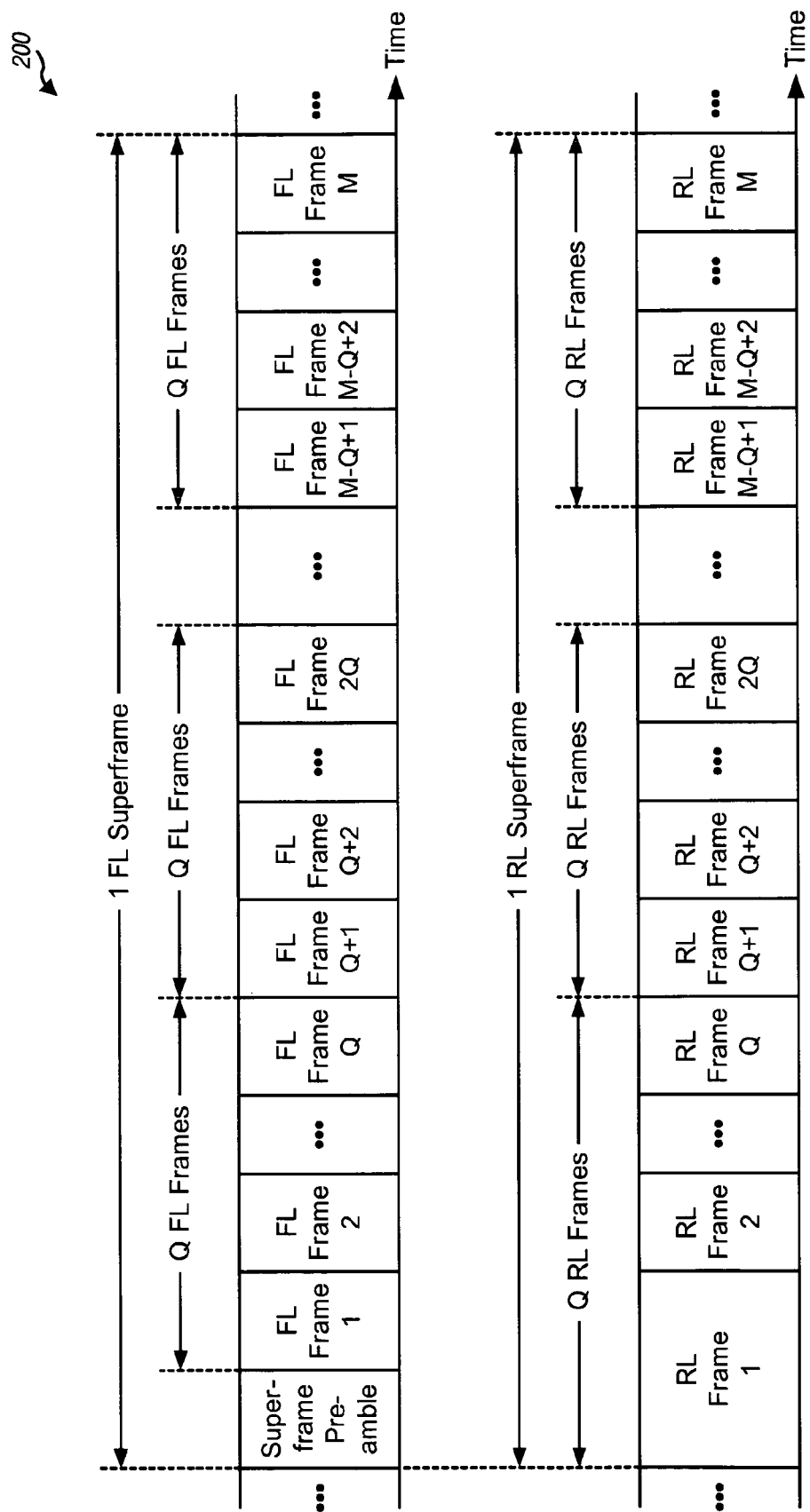
FIG. 2A shows superframe structures for the forward and reverse links.

FIG. 2A shows exemplary superframe structures 200 that may be used for the forward and reverse links. The transmission timeline for each link is partitioned into units of superframes. Each superframe spans a particular time duration, which may be fixed or configurable. For the forward link, each superframe includes a preamble followed by M frames, where M>1. A frame may refer to a time interval in a transmission timeline or a transmission sent during the time interval. The superframe preamble carries overhead information that enables the terminals to receive forward link control channels and subsequently access the system. Each subsequent frame may carry traffic data and/or signaling. For the reverse link, each superframe includes M frames, where the first frame may be extended by the length of the superframe preamble on the forward link. The superframes on the reverse link are time aligned with the superframes on the forward link.

FIG. 2A shows specific superframe structures for the forward and reverse links. In general, a superframe may span any time duration and may include any number of frames and other fields. The superframe structure for the reverse link may be the same or different from the superframe structure for the forward link.

Figure 2B:
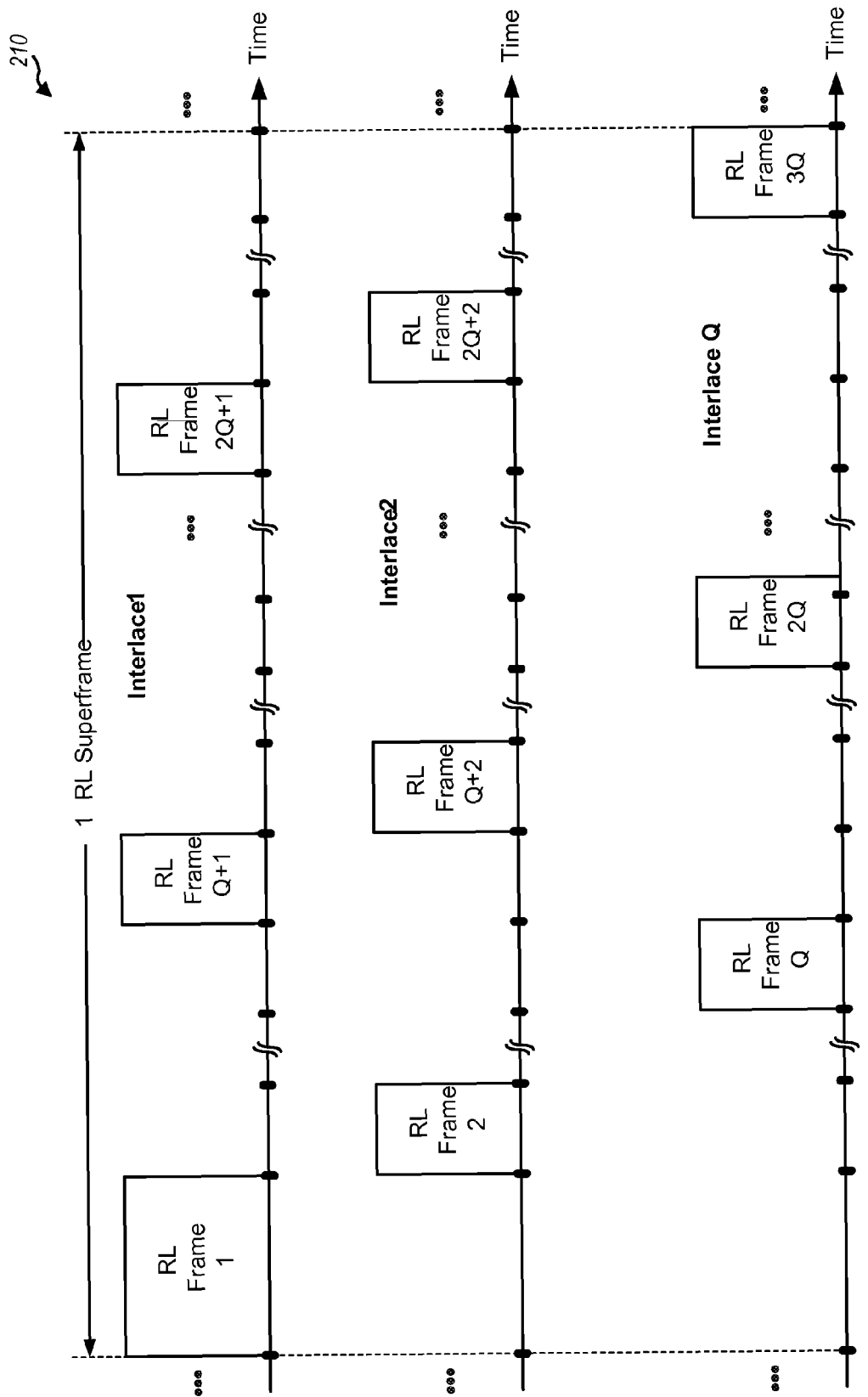
FIG. 2B shows an interlace structure for the reverse link.

FIG. 2B shows an interlace structure 210 for the reverse link. Referring back to FIG. 2A, for each link, the frames in each superframe may be arranged into groups, with each group including Q consecutive frames, where Q>1. Q interlaces may be formed for each link with this grouping of frames. In an embodiment, which is shown in FIG. 2B, interlace 1 includes frames 1, Q+1, 2Q+1, and so on, interlace 2 includes frames 2, Q+2, 2Q+2, and so on, and interlace Q includes frames Q, 2Q, 3Q, and so on. The Q interlaces are offset from one another by one frame. In an embodiment that is assumed for much of the description below, Q=6, six interlaces are formed and may be used to send six packets in an interlaced manner, one packet in each interlace, as described below.

System 100 may support frequency division duplexing (FDD) and/or time division duplexing (TDD). For FDD, the forward and reverse links are allocated separate frequency bands, and transmissions may be sent simultaneously on the two links, as shown in FIG. 2A. For TDD, the forward and reverse links share the same frequency band, and transmissions for the two links may be sent in different frames. For example, the forward link may be allocated odd-numbered frames, and the reverse link may be allocated even-numbered frames.

In an embodiment, a CDMA control segment is sent on the reverse link. The CDMA control segment carries various signaling channels for the reverse link. In an embodiment, the CDMA control segment is mapped to a fixed region of time and frequency in each CDMA frame. A CDMA frame is a frame in which the CDMA control segment is sent. In another embodiment, the CDMA control segment hops in a pseudo-random or deterministic manner from CDMA frame to CDMA frame to achieve frequency diversity.

Figure 3A:
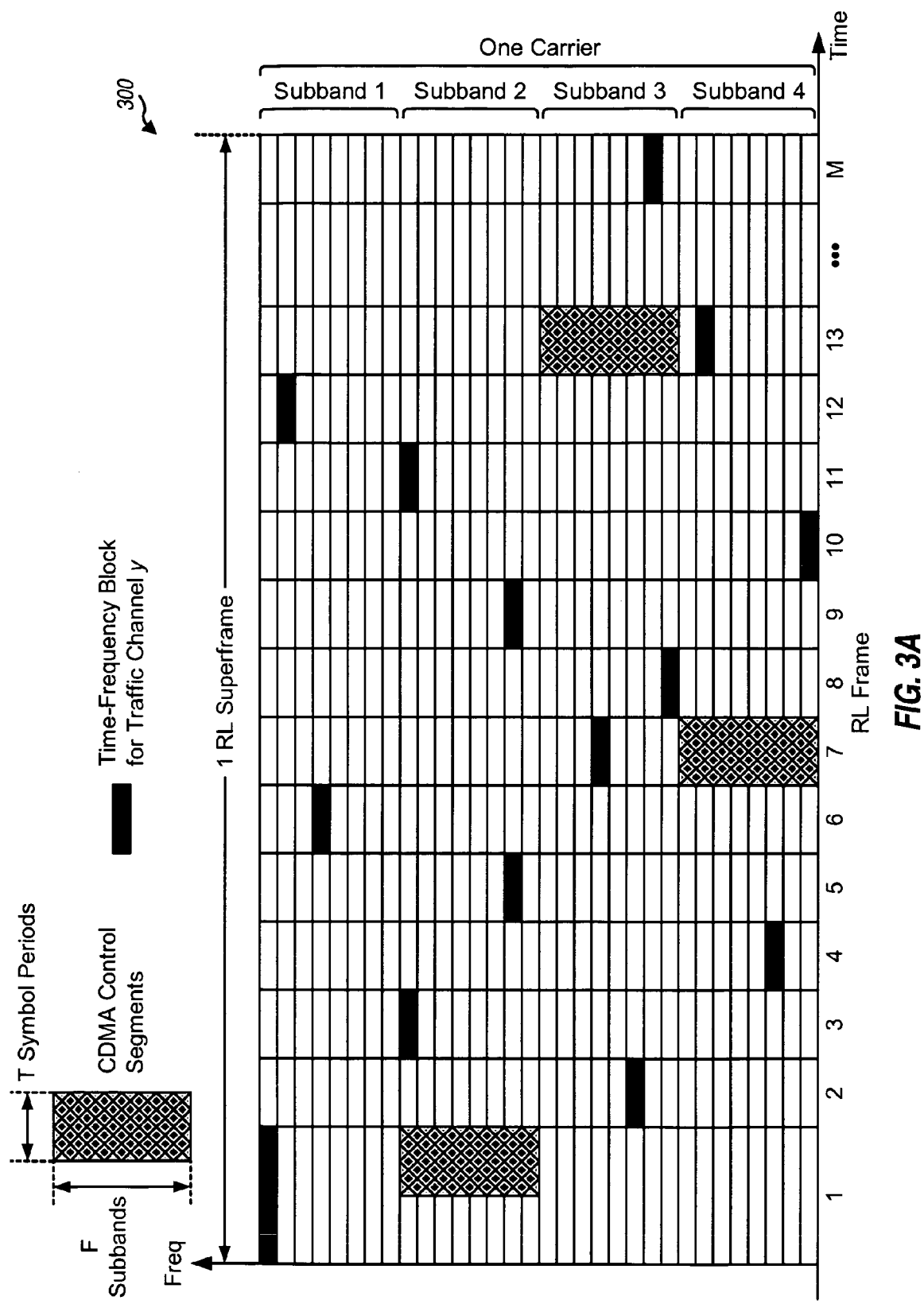
FIGS. 3A and 3B show a frequency hopping CDMA control segment with two different sizes for one carrier.

FIG. 3A shows an embodiment of a CDMA control segment 300 for a single carrier. For this embodiment, Q=6 and the CDMA control segment is sent on one interlace, or every $6^{th}$ frame. For this embodiment, the CDMA control segment spans an entire regular-size frame. If the CDMA control segment is sent on interlace 1, then for the extended RL frame 1, the CDMA control segment may be sent in the time interval corresponding to FL frame 1, as shown in FIG. 3A. If the CDMA control segment is sent on interlace 2, 3, 4, 5 or 6, then the CDMA control segment may be sent in the entire frame for each frame in that interlace.

Figure 3B:
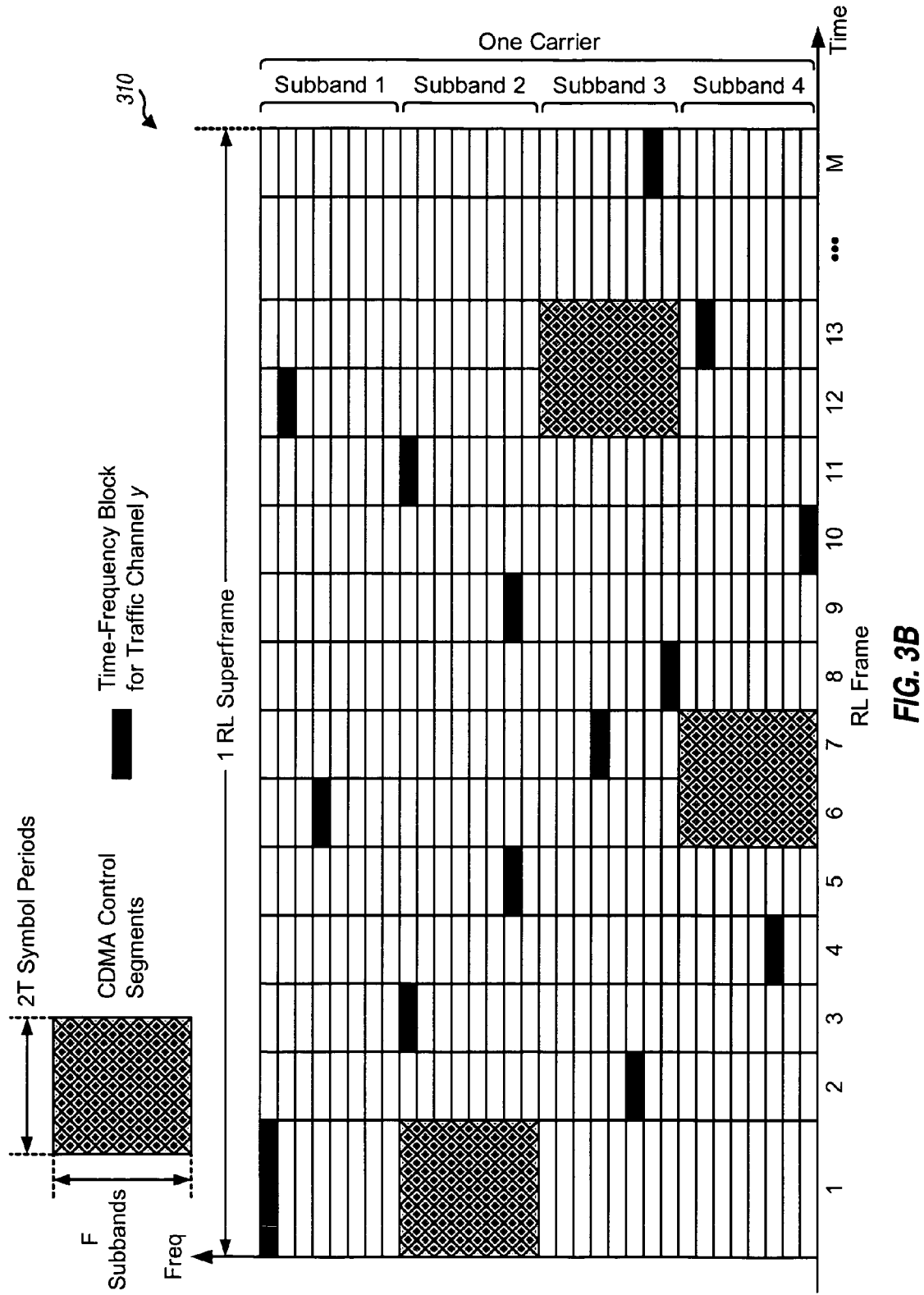

FIG. 3B shows an embodiment of an extended CDMA control segment 310 for a single carrier. For this embodiment, Q=6 and the CDMA control segment is sent on two adjacent interlaces in two regular-size frames. For the embodiment shown in FIG. 3B, the CDMA control segment is sent in the entire extended RL frame 1, RL frames 6 and 7, RL frames 12 and 13, and so on. The CDMA control segment may also be sent in other RF frames and/or on more than two adjacent interlaces.

Sending the CDMA control segment across an entire frame as shown in FIG. 3A or across multiple frames as shown in FIG. 3B, instead of across a portion of a frame, may improve link budget for terminals located at the edge of coverage. These terminals typically have an upper limit on transmit power. A longer CDMA control segment allows these terminals to transmit signaling with more energy spread over a longer period of time, which improves the likelihood of correctly receiving the signaling. In general, the CDMA control segment may be sent across an entire frame, across a portion of a frame, across multiple frames, across portions of multiple frames, and so on.

In an embodiment, the CDMA control segment occupies at least one subband in each CDMA frame. For the embodiment shown in FIG. 3A, P=4 and the CDMA control segment is sent on at least one of the four subbands in each CDMA frame. In an embodiment that is assumed for much of the description below, the size of the CDMA control segment is scalable in frequency, e.g., in units of subbands. For this embodiment, the CDMA control segment may span one, two, or possibly more subbands in each CDMA frame. The subband(s) for the CDMA control segment may be contiguous or may spread across the system bandwidth. In other embodiments, the size of the CDMA control segment may be scalable in time or both time and frequency.

In general, the CDMA control segment may be mapped to a time-frequency region that covers F subcarriers and spans T symbol periods, where F≥1 and T≥1, as shown in the upper left corner of FIG. 3A. The CDMA control segment includes U transmission units, where U=F·T. A transmission unit is one subcarrier in one symbol period. For clarity, much of the following description is for the embodiment in which the CDMA control segment occupies one or more subbands and spans an entire CDMA frame, except for RL frame 1. In an embodiment, K=512, P=4, and T=8. For this embodiment, the CDMA control segment (1) covers an integer multiple of 128 subcarriers in 8 symbol periods of a CDMA frame and (2) includes an integer multiple of 1024 transmission units, e.g., 1024, 2048, 3072 or 4096 transmission units.

FIG. 3A also shows frequency hopping for the CDMA control segment. The CDMA control segment may hop across frequency in different CDMA frames, as shown in FIG. 3A. The frequency hopping may be pseudo-random or deterministic.

FIG. 3A further shows an exemplary frequency-hopping scheme for traffic channels. A traffic channel is a means for sending data from a transmitter to a receiver and may also be called a channel, a physical channel, a physical layer channel, a data channel, and so on. Each traffic channel may be mapped to a specific sequence of time-frequency blocks that hop across frequency in different frames to achieve frequency diversity, as shown in FIG. 3A. In an embodiment, a time-frequency block corresponds to one set of subcarriers in one frame. A frequency hopping (FH) pattern indicates the specific time-frequency block to use for each traffic channel in each frame. FIG. 3A shows a sequence of time-frequency blocks for one traffic channel y. The other traffic channels may be mapped to vertically and circularly shifted versions of the time-frequency block sequence for traffic channel y.

In an embodiment, the frequency hopping for the traffic channels avoids the CDMA control segment. In another embodiment, the frequency hopping for the traffic channels is pseudo-random with respect to the CDMA control segment. For this embodiment, a number of (e.g., eight) subcarrier sets may be allocated for the CDMA control segment in each CDMA frame. Each traffic channel that collides with the CDMA control segment is then mapped to a subcarrier set allocated to the CDMA control segment. For this embodiment, the traffic channels and the CDMA control segment swap subcarriers whenever a collision occurs.

Figure 3C:
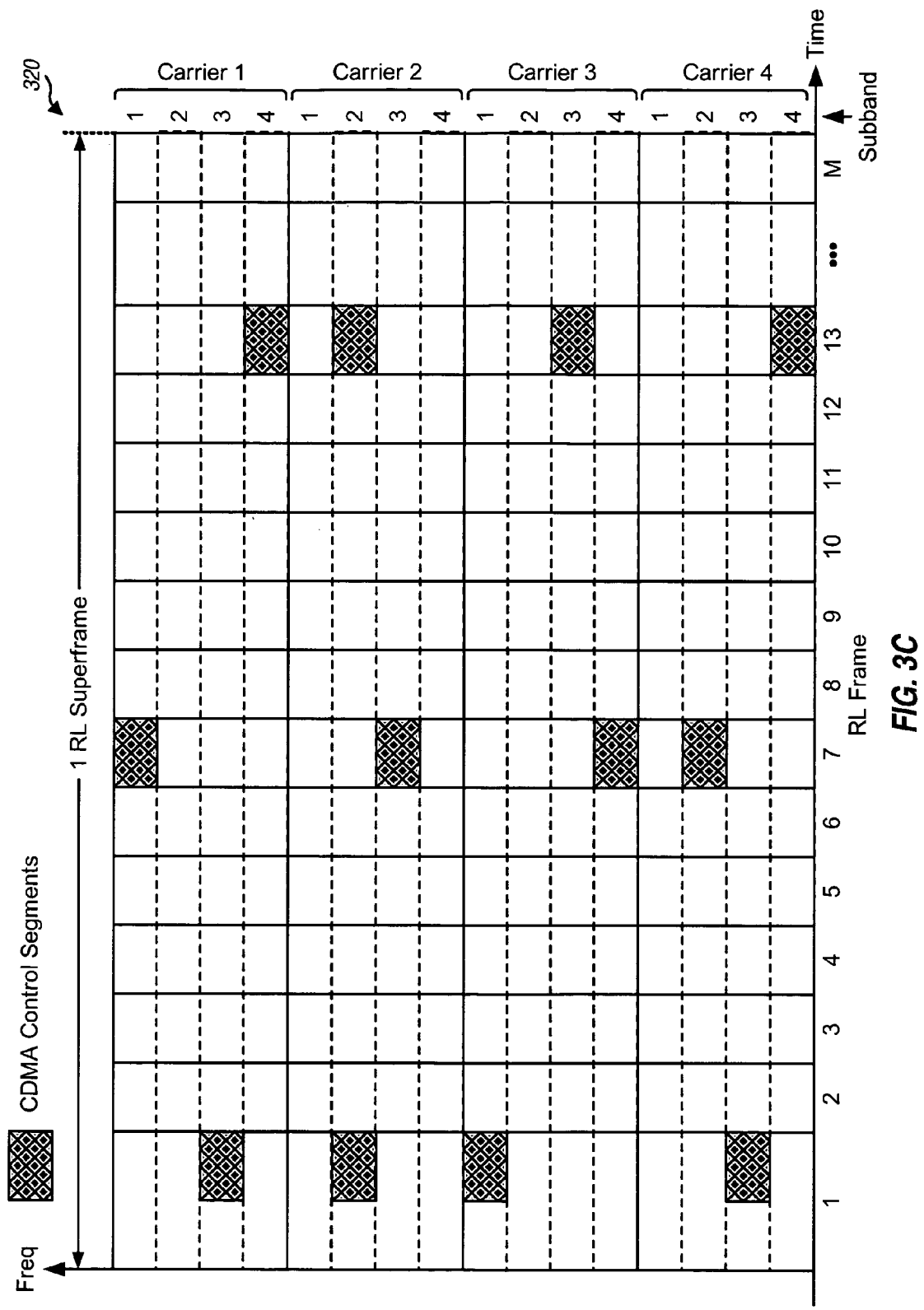
FIG. 3C shows a frequency hopping CDMA control segment for four carriers.

FIG. 3C shows an embodiment of a frequency hopping CDMA control segment 320 for four carriers. For this embodiment, one instance of the CDMA control segment is provided for each carrier. In an embodiment, the CDMA control segment instance for each carrier carries reverse link signaling for that carrier and is independent of the CDMA control segment instances for the other carriers. The four CDMA control segment instances for the four carriers (1) may have the same or different sizes, (2) may hop together or independently of one another, and (3) may be sent on one interlace, e.g., every $6^{th}$ frame.

FIGS. 3A and 3B show some embodiments of the CDMA control segment. In another embodiment, the CDMA control segment may be sent in multiple interlaces. In yet another embodiment, the CDMA control segment may be selectively enabled or disabled in each frame in which the CDMA control segment might be sent.

System 100 may utilize various signaling channels to support data transmission on the forward and reverse links. The signaling channels typically carry small amounts of signaling for the physical layer. The specific signaling channels to use for each link may be dependent on various factors such as, e.g., the manner in which traffic data is transmitted, the manner in which signaling is transmitted, the design of the traffic channels and the signaling channels, and so on.

Table 1 lists exemplary signaling channels for the reverse link and a short description for each signaling channel. In an embodiment, which is described in detail below, all of the signaling channels shown in Table 1 except for the acknowledgment (ACK) channel are sent on the CDMA control segment. A signaling channel that is sent on the CDMA control segment is called a CDMA signaling channel. The ACK channel may be sent using time and/or frequency division multiplexing to achieve good performance for the ACK channel. In general, any signaling channel may be sent on the CDMA control segment.

TABLE 1

| Signaling Channel | Notation | Description |
| --- | --- | --- |
| ACK Channel | ACKCH | Carry ACKs for packets received from a base station. |

TABLE 1-continued

| Signaling Channel | Notation | Description |
| --- | --- | --- |
| CQI Channel | CQICH | Carry CQIs used for rate control on the forward link. |
| Request Channel | REQCH | Carry requests for resources on the reverse link. |
| Beamforming Feedback Channel | BFCH | Carry feedback for beamforming and spatial multiplexing on the forward link. |
| Subband Feedback Channel | SFCH | Carry feedback for adaptive subband scheduling on the forward link. |
| Pilot Channel | PICH | Carry a broadband pilot. |
| Access Channel | ACH | Carry access probes for accessing the system. |

The use of some of the signaling channels in Table 1 for data transmission on the forward link is described below.

Figure 4:
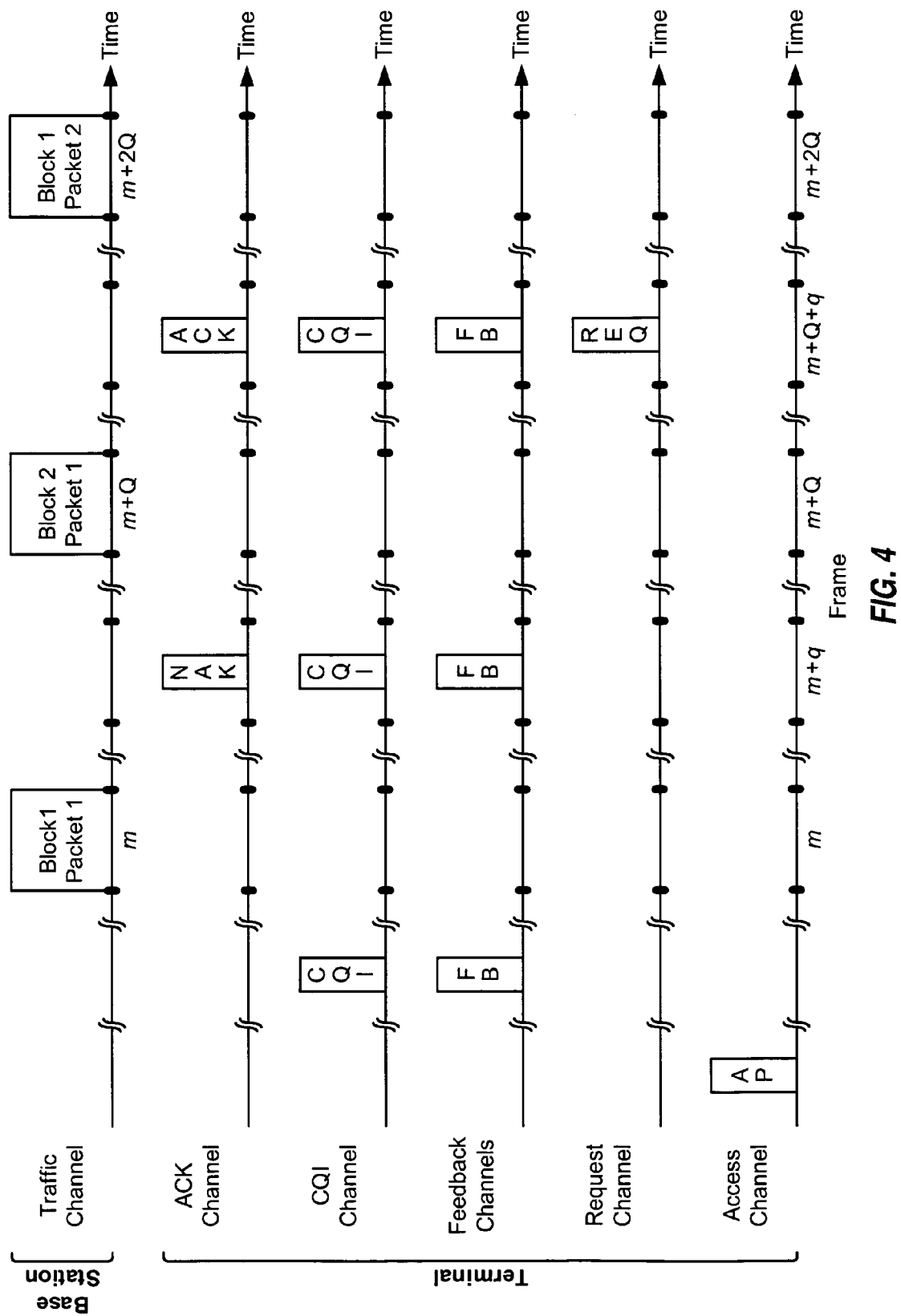
FIG. 4 shows H-ARQ transmission on the forward link.

FIG. 4 shows a hybrid automatic repeat request (H-ARQ) transmission on the forward link, which is also called an incremental redundancy (IR) transmission. A terminal initially sends access probes (AP) on the access channel to access the system. Thereafter, if a base station has data to send to the terminal, then the base station may request for the received signal quality at the terminal and/or other information that may be used for data transmission to the terminal. The terminal estimates the received signal quality for the forward link and sends a channel quality indicator (CQI) value on the CQI channel to the base station. The received signal quality may be quantified by a signal-to-interference-and-noise ratio (SINR) and/or some other signal quality metric. The terminal may also send other types of feedback (e.g., for beamforming and/or subband scheduling) on the feedback channels.

The base station receives the CQI value from the terminal and selects a packet format (e.g., data rate, packet size, and so on) to use for data transmission to the terminal. The base station then processes (e.g., encodes and modulates) a data packet (Packet 1) in accordance with the selected packet format and generates multiple (V) data blocks for the packet, where V>1. A data packet may also be called a codeword and so on, and a data block may also be called a subpacket and so on. Each data block may contain sufficient information to allow the terminal to correctly decode the packet under favorable channel conditions. The V data blocks typically contain different redundancy information for the packet. The V data blocks may be sent one block at a time until the packet is terminated. The data blocks may be sent on one interlace, one data block in each frame, and the block transmissions would then be spaced apart by Q frames.

The base station transmits the first data block (Block 1) for Packet 1 in frame m. The terminal receives and processes (e.g., demodulates and decodes) Block 1, determines that Packet 1 is decoded in error, and sends a negative acknowledgment (NAK) on the ACK channel to the base station in frame m+q, where q is the ACK/NAK delay and 1≤q<Q. The base station receives the NAK and transmits the second data block (Block 2) for Packet 1 in frame m+Q. The terminal receives Block 2, processes Blocks 1 and 2, determines that Packet 1 is decoded correctly, and sends back an ACK in frame m+Q+q. The base station receives the ACK and terminates the transmission of Packet 1. The base station processes the next data packet (Packet 2) and transmits the data blocks for Packet 2 in similar manner.

For clarity, FIG. 4 shows transmission of both NAKs and ACKs. For an ACK-based scheme, an ACK is sent if a packet is decoded correctly, and NAKs are not sent and are presumed by the absence of ACKs.

In FIG. 4, a new data block is sent every Q frames on a given interlace. To improve channel utilization, the base station may transmit up to Q packets on the Q interlaces. The H-ARQ retransmission delay Q and the ACK/NAK delay q are typically selected to provide sufficient processing time for both the transmitter and receiver.

As shown in FIG. 4, the terminal may send CQI and other feedbacks periodically on the signaling channels. The terminal may also send a request (REQ) for resources on the reverse link to transmit data to the base station.

Figure 5:
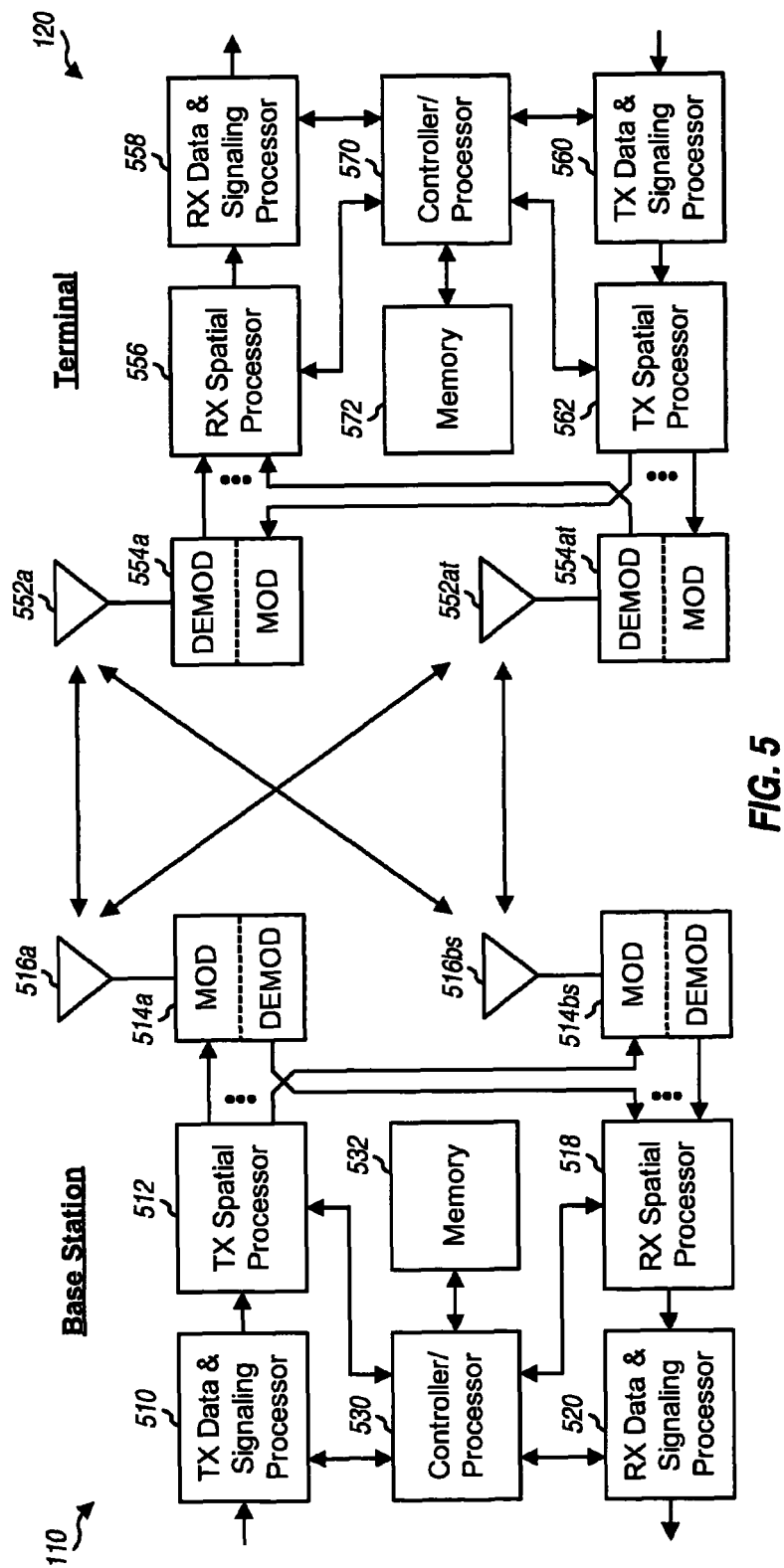
FIG. 5 shows a block diagram of a base station and a terminal.

FIG. 5 shows a block diagram of an embodiment of a base station 110 and a terminal 120 in FIG. 1. For this embodiment, base station 110 and terminal 120 are each equipped with multiple antennas.

At base station 110, a transmit (TX) data and signaling processor 510 receives traffic data for one or more terminals, processes (e.g., formats, encodes, interleaves, and symbol maps) the traffic data for each terminal in accordance with one or more packet formats selected for that terminal, and provides data symbols. Processor 510 also generates pilot symbols and signaling symbols. As used herein, a data symbol is a symbol for traffic data, a pilot symbol is a symbol for pilot, which is data that is known a priori by both the base station and the terminals, a signaling symbol is a symbol for signaling, and a symbol is typically a complex value. A TX spatial processor 512 performs transmitter spatial processing (e.g., adaptive beamforming) on the data symbols, pilot symbols, and/or signaling symbols and provides $N_{bs}$ streams of transmit symbols to $N_{bs}$ modulators (MOD) 514a through 514bs. Each modulator 514 performs OFDM modulation on its transmit symbol stream and provides a stream of OFDM symbols. If system 100 utilizes SC-FDMA, then each modulator 514 performs SC-FDMA modulation and provides a stream of SC-FDMA symbols. Each modulator 514 further conditions (e.g., converts to analog, filters, amplifies, and upconverts) its OFDM symbol stream and generates an FL modulated signal. Modulators 514a through 514bs provide $N_{bs}$ FL modulated signals, which are transmitted from $N_{bs}$ antennas 516a through 516bs, respectively.

At terminal 120, $N_{at}$ antennas 552a through 552 at receive the FL modulated signals from base station 110 and possibly other base stations and provides $N_{at}$ received signals to $N_{at}$ demodulators (DEMOD) 554a through 554at, respectively. Each demodulator 554 processes (e.g., conditions and digitizes) its received signal and obtains input samples. Each demodulator 554 further performs OFDM demodulation on the input samples and provides frequency-domain received symbols for all subcarriers. A receive (RX) spatial processor 556 performs receiver spatial processing on the received symbols from all $N_{at}$ demodulators 554a through 554at and provides data symbol estimates, which are estimates of the data symbols sent by base station 110 to terminal 120. An RX data and signaling processor 558 processes (e.g., symbol demaps, deinterleaves, and decodes) the data symbol estimates and provides decoded data for terminal 120.

A controller/processor 570 receives decoding results from RX data and signaling processor 558 and measurements for received signal quality and FL channel response from RX spatial processor 556. Controller/processor 570 generates various types of signaling for terminal 120. A TX data and signaling processor 560 generates signaling symbols for the signaling from controller/processor 570, data symbols for traffic data to be sent to base station 110, and pilot symbols. A TX spatial processor 562 performs transmitter spatial processing on the data symbols, pilot symbols, and/or signaling symbols and provides transmit symbols, which are further processed by modulators 554a through 554at and transmitted via antennas 552a through 552at.

At base stations 110, the RL modulated signals from terminal 120 and other terminals are received by antennas 516a through 516bs, conditioned, digitized, and OFDM demodulated by demodulators 514a through 514bs, spatially processed by an RX spatial processor 518, and further processed by an RX data and signaling processor 520 to recover the traffic data and signaling sent by terminal 120 and other terminals. A controller/processor 530 receives the signaling and controls data transmissions on the forward link to the terminals.

Controllers/processors 530 and 570 direct the operation of various processing units at base station 110 and terminal 120, respectively. Memories 532 and 572 store program codes and data for base station 110 and terminal 120, respectively.

Figure 6:
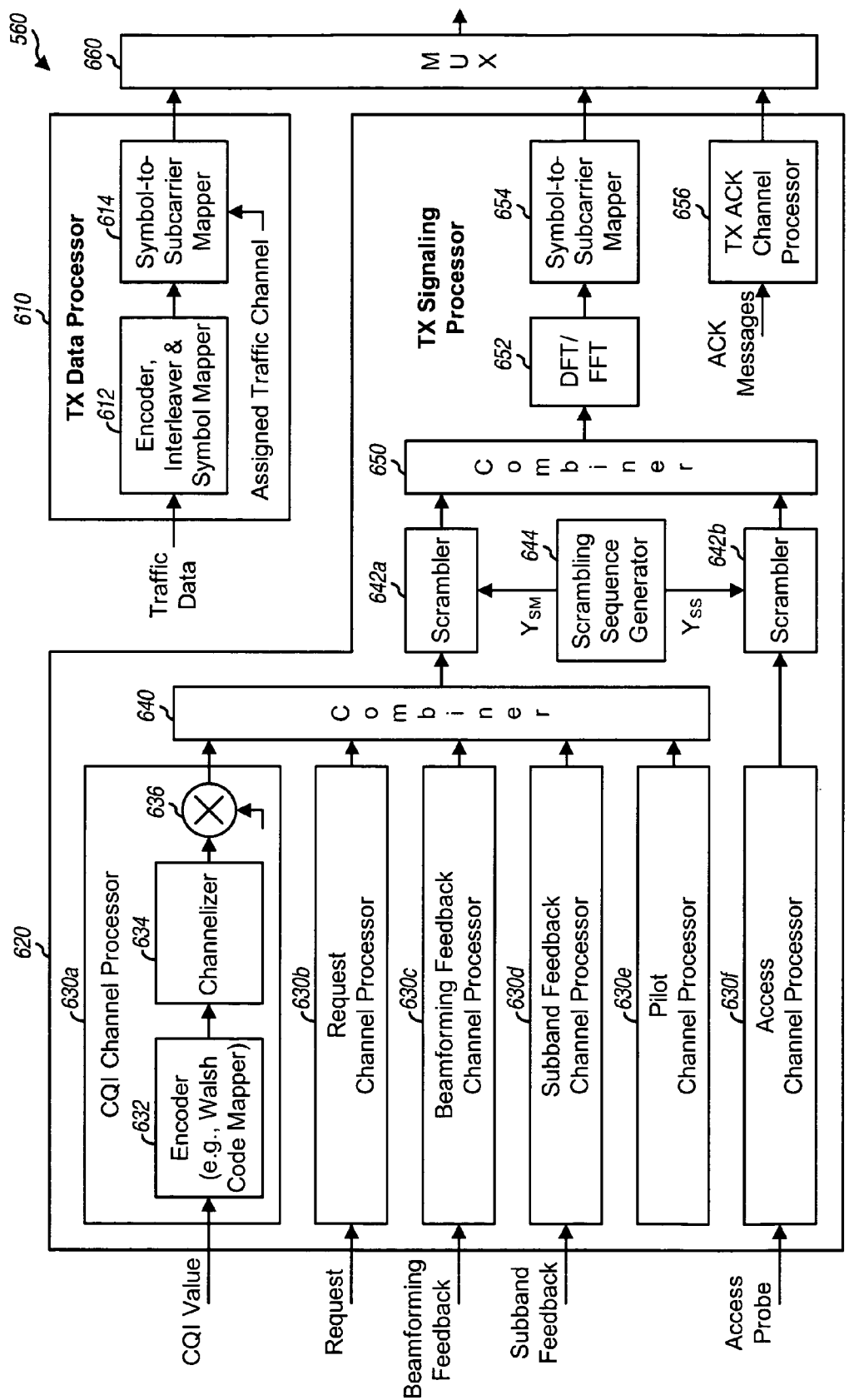
FIG. 6 shows a block diagram of a transmit data and signaling processor.

FIG. 6 shows a block diagram of an embodiment of TX data and signaling processor 560 at terminal 120 in FIG. 5. For this embodiment, processor 560 includes a TX data processor 610, a TX signaling processor 620, and a multiplexer (MUX) 660.

Within TX data processor 610, a unit 612 encodes, interleaves, and symbol maps traffic data and provides data symbols. A symbol-to-subcarrier mapper 614 maps the data symbols to time-frequency blocks for a traffic channel assigned to terminal 120.

FIG. 6 shows the embodiment in which all signaling channels except for the ACK channel are sent on the CDMA control segment. For this embodiment, TX signaling processor 620 includes a channel processor 630a for each CDMA signaling channel. Within a channel processor 630a, an encoder 632 encodes a CQI value and provides a coded message $W_{CQICH}$. A channelizer 634 multiplies the coded message with a channelization sequence $S_{CQICH}$. A multiplier 636 multiplies the output of channelizer 634 with a gain $G_{CQICH}$ and provides an output sequence $X_{CQICH}$ for the CQI channel. A channel processor 630b encodes a request message, multiplies the resultant coded message with a channelization sequence $S_{REQCH}$, scales the channelized sequence with a gain $G_{REQCH}$, and provides an output sequence $X_{REQCH}$ for the request channel. A channel processor 630c encodes beamforming feedback, multiplies the resultant coded message with a channelization sequence $S_{BFCH}$, scales the channelized sequence with a gain $G_{BFCH}$, and provides an output sequence $X_{BFCH}$ for the beamforming feedback channel. A channel processor 630d encodes subband feedback, multiplies the resultant coded message with a channelization sequence $S_{SFCH}$, scales the channelized sequence with a gain $G_{BFCH}$, and provides an output sequence $X_{SFCH}$ for the subband feedback channel. A channel processor 630e encodes pilot data, multiplies the resultant coded message with a channelization sequence $S_{PICH}$, scales the channelized sequence with a gain $Gp_{JCH}$, and provides an output sequence $X_{PICH}$ for the pilot channel. A channel processor 630f encodes an access probe, multiplies the resultant coded message with a channelization sequence $S_{ACH}$, scales the channelized sequence with a gain $G_{ACH}$, and provides an output sequence $X_{ACH}$ for the access channel.

The transmit power for each signaling channel may be controlled by selecting an appropriate gain for that signaling channel. The transmit power may be selected to achieve a target level of performance, e.g., 50% erasure rate or lower and 1% error rate.

A combiner 640 combines the output sequences from channel processors 630a through 630e and provides a composite sequence $X_{SM}$. A scrambler 642a scrambles the composite sequence $X_{SM}$ with a scrambling sequence $Y_{SM}$ provided by a scrambling sequence generator 644 and provides a first scrambled sequence $Z_{SM}$. A scrambler 642b scrambles the output sequence $X_{ACH}$ for the access channel with a scrambling sequence $Y_{SS}$ provided by the scrambling sequence generator 644 and provides a second scrambled sequence $Z_{SS}$. A combiner 650 combines the first and second scrambled sequences and provides a time-domain output sequence $Z_{OUT}$. Combiner 650 also partitions the output sequence $Z_{OUT}$ into T output sub-sequences $Z_1$ through $Z_T$ for the T symbol periods of the CDMA control segment. Each output sub-sequence contains up to F time-domain samples.

In an embodiment, which is shown in FIG. 6, signaling is sent in the time domain. For this embodiment, a unit 652 transforms each output sub-sequence to the frequency domain with a DFT or FFT and provides F signaling symbols for the F subcarriers of the CDMA control segment. In another embodiment, which is not shown in FIG. 6, signaling is sent in the frequency domain. For this embodiment, combiner 650 provides the signaling symbols, and DFT/FFT unit 652 is omitted. For both embodiments, a symbol-to-subcarrier mapper 654 maps the F signaling symbols for each output sub-sequence to F subcarriers in one symbol period for the CDMA control segment.

A TX ACK channel processor 656 processes an ACK message, generates signaling symbols for the ACK message, and maps these signaling symbols to time and frequency segments allocated for the ACK channel. Multiplexer 660 receives and multiplexes the data symbols from TX data processor 610 and the signaling symbols from TX signaling processor 620 and provides multiplexed data and signaling symbols.

In an embodiment, a terminal may communicate with one or more sectors in one or more synchronous subsets. Each synchronous subset includes one or more sectors that are synchronous with one another. The sectors in different synchronous subsets may not be synchronous with one another. In an embodiment, a terminal may be assigned a different identifier or media access control identifier (MACID) for communication with each synchronous subset. The synchronous subsets are described in commonly assigned U.S. patent publication No. US2006/0223449 filed on the same day herewith, and incorporated herein by reference.

In an embodiment, a terminal may send the CQICH, REQCH, BFCH, SFCH and PICH to a target base station in a serving synchronous subset, which is a synchronous subset that contains a FL serving sector. A target base station is a base station to which the signaling is sent. A FL serving sector is a base station currently transmitting data to the terminal. In an embodiment, a terminal may send the CQICH to a target base station in a non-serving synchronous subset, which is a synchronous subset that does not contain the FL serving sector. The terminal may send the CQICH to the serving synchronous subset and/or one or more non-serving synchronous subsets.

The signaling for the CDMA control segment may be processed in various manners. A specific embodiment is described below. For this embodiment, a B-bit signaling message $m_c$ to be sent on signaling channel c, where $c \in \{CQICH, REQCH, BFCH, SFCH, PICH, and ACH\}$, may be processed as follows. Message $m_c$ is first encoded by mapping this message to an L-bit coded message $W_c$, where $L=2^B$.

In an embodiment, the coded message $W_c$ is a Walsh sequence of length L. A 2×2 Hadamard matrix $\underline{W}_{2\times2}$ and a larger size Hadamard matrix $\underline{W}_{2k\times2k}$ may be expressed as:

$$\underline{W}_{2\times2} = \begin{bmatrix} 1 & 1 \\ 1 & -1 \end{bmatrix} \text{ and } \underline{W}_{2k\times2k} = \begin{bmatrix} \underline{W}_{k\times k} & \underline{W}_{k\times k} \\ \underline{W}_{k\times k} & -\underline{W}_{k\times k} \end{bmatrix}. \quad \text{Eq (1)}$$

Hadamard matrices of square dimensions that are power of two (e.g., 2×2, 4×4, 8×8, and so on) may be formed as shown in equation (1). L different Walsh sequences of length L may be formed with L column of an L×L Hadamard matrix $\underline{W}_{L\times L}$. The signaling message $M_c$ has a B-bit binary value of i, where $0 \leq i \leq (L-1)$. The (i+1)-th column of the Hadamard matrix $\underline{W}_{L\times L}$ is provided as the coded message $W_c$. In an embodiment, the signaling message $M_c$ is 10 bits long, and the coded message $W_c$ is a 1024-bit Walsh sequence that may be given as:

$$W_c = \{w_1^i, w_2^i, w_3^i, \ldots, w_{1024}^i\}, \quad \text{Eq (2)}$$

where each Walsh bit $w_k^i$, for $k=1, \ldots, 1024$, can take on a value of +1 or −1, or $w_k^i \in \{+1, -1\}$. In an embodiment, the coded message $W_{PICH}$ for the PICH is a sequence of all ones, which corresponds to Walsh code 0 from the first column of $\underline{W}_{L\times L}$. A signaling message may also be encoded in other manners besides the Walsh code mapping described above.

The coded message $W_c$ is channelized with a channelization sequence $S_c$ for signaling channel c. In an embodiment, the channelization sequence $S_c$ is generated as follows. A 20-bit shift register generates a pseudo-random binary sequence $F_c$ based on the following generator polynomial:

$$h(D) = D^{20} + D^{17} + D^{12} + D^{10} + 1, \quad \text{Eq (3)}$$

where D denotes a delay of one bit. The initial state of the 20-bit shift register is set to a 20-bit value $F_{c,init}$, which may be generated as follows:

$$F_{c,init} = [\text{Bit reverse}(A_c \cdot P_r)] \mod 2^{20}, \quad \text{Eq (4)}$$

where $P_r$ is a large prime number, e.g., $P_r = 2,654,435,761$; and
$A_c$ is a seed value for signaling channel c.
The same large prime number may be used for all signaling channels.

In an embodiment, the seed value for signaling channel c is given as:

$$A_c = \\ [s_3 s_2 s_1 m_5 m_4 m_3 m_2 m_1 p_{12} p_{11} p_{10} p_9 p_8 p_7 p_6 p_5 p_4 p_3 p_2 p_1], \quad \text{Eq (5)}$$

where $[c_3 c_2 c_1]$ is a 3-bit index for signaling channel c;
$[m_5 m_4 m_3 m_2 m_1]$ is a 5-bit index for the frame in which the signaling is sent; and
$[p_{12} p_{11} p_{10} p_9 p_8 p_7 p_6 p_5 p_4 p_3 p_2 p_1]$ is a 12-bit identifier for a target base station.

The signaling channels may be assigned different indices that may be used to generate different seed values, and hence different channelization sequences, for these signaling channels. In an embodiment, the CQICH is assigned an index of [000] (binary), the BFCH is assigned an index of [001], the SFCH is assigned an index of [010], the ACH is assigned an index of [100], the REQCH is assigned an index of [101], and the PICH is assigned an index of [110]. The target base station may be the FL serving sector in the serving synchronous subset, a designated sector in a non-serving synchronous subset, and so on.

The binary sequence $F_c$ of length L/2 from the shift register may be given as:

$$F_c = \{f_c^1, f_c^2, f_c^3, \ldots, f_c^{L/2}\}. \quad \text{Eq (6)}$$

The binary sequence $F_c$ is repeated 2R times to form the channelization sequence $S_c$ of length L·R, as follows:

$$S_c = \{\underbrace{f_c^1, \ldots, f_c^1}_{first\ 2R\ bits}, \underbrace{f_c^2, \ldots, f_c^2}_{next\ 2R\ bits}, \ldots, \underbrace{f_c^{L/2}, \ldots, f_c^{L/2}}_{last\ 2R\ bits}\}, \qquad \text{Eq (7)}$$

where R is a repetition factor that is selected as described below.

As shown in equation (5), the seed value $A_c$ and hence the channelization sequence $S_c$ for each signaling channel is dependent on (1) an index for that signaling channel, which allows the target base station to distinguish the different CDMA signaling channels, (2) the frame in which the signaling is sent, and (3) the identifier of the target base station, which allows each base station to receive the signaling sent for that base station.

To channelize the coded message $W_c$, this message is first repeated R times to form a repeated sequence containing L·R bits. The repetition factor R is selected such that the total number of bits after the repetition is less than or equal to the total number of transmission units in the CDMA control segment, or L·R≤U. For simplicity, the following description assumes that L·R=U. The repeated sequence is multiplied with the channelization sequence $S_c$ to obtain an output sequence $X_c$ for signaling channel c, as follows:

$$X_c = \{\underbrace{(-1)^{s_c^1} \cdot w_1^j, \ldots, (-1)^{s_c^R} \cdot w_1^j, \ldots,}_{first\ R\ bits}$$
$$\underbrace{(-1)^{s_c^{1023R+1}} \cdot w_{1024}^j, \ldots, (-1)^{s_c^{1024 \cdot R}} \cdot w_{1024}^j}_{last\ R\ bits}\}. \qquad \text{Eq (8)}$$

As shown in equation (8), each bit in the repeated sequence is either (1) inverted if the corresponding bit in the channelization sequence $S_c$ is equal to 1 or (2) not inverted otherwise. The output sequence $X_c$ for signaling channel c may be scaled based on the power allocated to that signaling channel, as shown in FIG. 6. The CDMA signaling channels may be allocated the same or different amounts of power. For simplicity, the power scaling is omitted in equation (8).

In an embodiment, the last R·F bits of the output sequence $X_{ACH}$ for the ACH are set to zero, and the length of the output sequence $X_{ACH}$ is effectively shortened to (L−F)·R. In another embodiment, the coded message $W_{ACH}$ or the repeated message for the ACH is formed such that it is shorter than L·R bits. The shorter repeated sequence is multiplied with a shorter channelization sequence to obtain a shorter output sequence $X_{ACH}$. In any case, the shorter output sequence $X_{ACH}$ may be sent in a smaller time duration. This provides some guard time to account for inaccurate timing at a terminal when sending an access probe to the system.

In an embodiment, the CDMA signaling channels may be individually enabled and disabled for each CDMA frame. A given CDMA signaling channel may be disabled by setting the output sequence $X_c$ for that signaling channel to a sequence of all zeros.

In an embodiment, the output sequences for the CQICH, REQCH, BFCH, SFCH, and PICH may be combined by combiner 640 to obtain a composite sequence $X_{SM}^s$ for the serving synchronous subset. In an embodiment, the output sequence for the CQICH may be provided as a composite sequence $X_{SM}^{ns}$ for a non-serving synchronous subset. In an embodiment, the composite sequences $X_{SM}^s$ and $X_{SM}^{ns}$ may be given as follows:

$$X_{SM}^s = (X_{CQICH} + X_{SFCH} + X_{PICH}) + j(X_{REQCH} + X_{BFCH}),$$
and $\qquad \text{Eq (9a)}$ $$X_{SM}^{ns} = X_{CQICH}. \qquad \text{Eq (9b)}$$

The composite sequences $X_{SM}^s$ and $X_{SM}^{ns}$ each contain U complex values. For the embodiment shown in equation (9a), the CQICH, SFCH, and PICH are sent in the inphase (I) component and the REQCH and BFCH are sent in the quadrature (Q) component of $X_{SM}^s$. The output sequences for the CQICH, REQCH, BFCH, SFCH, and PICH may also be combined in other manners for the serving synchronous subset. In the following description, the composite sequence $X_{SM}$ may be equal to $X_{SM}^s$ for the serving synchronous subset or $X_{SM}^{ns}$ for the non-serving synchronous subset.

In an embodiment, the composite sequence $X_{SM}$ is scrambled with a scrambling sequence $Y_{SM}$ that is specific for both the target base station and the terminal. The scrambling sequence $Y_{SM}$ is thus different for different synchronous subsets. The scrambling sequence $Y_{SM}$ may be generated as follows. A 28-bit shift register generates a pseudo-random binary sequence $F_{SM}$ based on the following generator polynomial:

$$h(D) = D^{28} + D^{25} + 1. \qquad \text{Eq (1)}$$

The initial state of the 28-bit shift register is set to a 28-bit value $F_{SM,int}$, which may be generated as follows:

$$F_{SM,int} = [\text{Bit reverse } (A_{SM} \cdot P_c)] \bmod 2^{28}, \qquad \text{Eq (2)}$$

where $A_{SM} = [m_5\ m_4\ m_3\ m_2\ m_1\ t_{11}\ t_{10}\ t_9\ t_8\ t_7\ t_6\ t_5\ t_4\ t_3\ t_2\ t_1 p_{12}\ p_{11}\ p_{10}\ p_9\ p_8\ p_7\ p_6\ p_5\ p_4\ p_3\ p_2\ p_1]$, and $[t_{11}\ t_{10}\ t_9\ t_8\ t_7\ t_6\ t_5\ t_4\ t_3\ t_2\ t_1]$ is an 11-bit identifier or MACID for the terminal, which may be different for different synchronous subsets.

The scrambling sequence $Y_{SM}$ may then be generated as follows:

$$Y_{SM} = \{y_{SM}^1, y_{SM}^2, y_{SM}^3, \ldots, y_{SM}^u\}, \qquad \text{Eq (12)}$$

$$y_{SM}^{k+1} = y_{SM}^k \cdot e^{j(\pi/2) \cdot (2 \cdot f_{SM}^k - 1)}, \text{ for } k=1, \ldots, (U-1), \text{ with}$$
$$y_{SS}^1 = 1, \qquad \text{Eq (13)}$$

where $f_{SM}^k \in \{0, 1\}$ is the k-th bit of the binary sequence $F_{SM}$; and $y_{SM}^k \in \{-1, +1\}$ is the k-th bit of the scrambling sequence $Y_{SM}$.

The scrambling sequence $Y_{SM}$ rotates +90° or −90° in a pseudo-random manner from bit to bit based on the pseudo-random binary sequence $F_{SM}$.

The composite sequence $X_{SM}$ may be scrambled with the scrambling sequence $Y_{SM}$ to generate a scrambled sequence $Z_{SM}$, as follows:

$$Z_{SM} = \{y_{SM}^1 \cdot x_{SM}^1, y_{SM}^2 \cdot x_{SM}^2, y_{SM}^3 \cdot x_{SM}^3, \ldots,$$
$$y_{SM}^U \cdot x_{SM}^U\}, \qquad (14)$$

where $X_{SM}^k \in \{-1, +1\}$ is the k-th bit of the composite sequence $X_{SM}$.

In an embodiment, the output sequence $X_{ACH}$ for the ACH is scrambled with a scrambling sequence $Y_{SS}$ that is specific for the target base station. The reason for using a sector-specific scrambling sequence $Y_{SS}$ for the ACH is because (1) a terminal that is attempting to access the system may not have a valid MACID and (2) the target base station is typically not aware of which terminals are attempting to access that base station. The scrambling sequence $Y_{SS}$ may be generated as follows. A pseudo-random binary sequence $F_{SS}$ of length U may be generated as described above with a seed value of $A_{SS} = [1\ 1\ 1\ m_5\ m_4\ m_3\ m_2\ m_1\ p_{12}\ p_{11}\ p_{10}\ p_9\ p_8\ p_7\ p_6\ p_5\ p_4\ p_3\ p_2\ p_1]$. The scrambling sequence $Y_{SS}$ may then be formed as:

$$Y_{SS} = \{y_{SS}^1, y_{SS}^2, y_{SS}^3, \ldots, y_{SS}^U\}, \quad \text{Eq (15)}$$

$$y_{SS}^{k+1} = y_{SS}^k \cdot e^{j(\pi/2)\cdot(2\cdot f_{SS}^k - 1)}, \text{ for } k=1, \ldots, (U-1), \text{ with}$$
$$y_{SS}^1 = 1, \quad \text{Eq (16)}$$

where $f_{SS}^k \in \{0, 1\}$ is the k-th bit of the binary sequence $F_{SS}$; and $y_{SS}^k \in \{-1, +1\}$ is the k-th bit of the scrambling sequence $Y_{SS}$.

The output sequence $X_{ACH}$ may be scrambled with the scrambling sequence $Y_{SS}$ to generate a scrambled sequence $Z_{SS}$, as follows:

$$Z_{SS} = \{y_{SS}^1 \cdot x_{ACH}^1, y_{SS}^2 \cdot x_{ACH}^2, y_{SM}^3 \cdot x_{ACH}^3, \ldots,$$
$$y_{SS}^U \cdot x_{ACH}^U\}, \quad \text{Eq (17)}$$

where $x_{ACH}^k \in \{-1, +1\}$ is the k-th bit of the output sequence $X_{ACH}$. As noted above, some of the bits at the end of the output sequence $X_{ACH}$ may be set to zero.

In an embodiment, the scrambled sequences $Z_{SM}$ and $Z_{SS}$ are combined by combiner 650 to generate the output sequence $Z_{OUT}$, as follows:

$$Z_{OUT} = \{z_{SM}^1 + z_{SS}^1, z_{SM}^2 + z_{SS}^2, z_{SM}^3 + z_{SS}^3, \ldots, z_{SM}^U + z_{SS}^U\}, \quad \text{Eq (18)}$$

where $z_{SM}^k$ and $z_{SS}^k$ are the k-th bits of the output sequences $Z_{SM}$ and $Z_{SS}$, respectively. The output sequence $Z_{OUT}$ is further processed and sent on the CDMA control segment.

For the embodiment described above, the messages for the CDMA signaling channels have a fixed length of B bits. This allows the messages to be mapped to Walsh sequences of length L, where $L=2^B$. For this embodiment, a message with more than B bits may be partitioned and sent (1) on one instance of the signaling channel in multiple CDMA frames or (2) on multiple instances of the signaling channel in one CDMA frame. Multiple instances of a given signaling channel may be obtained, e.g., by sending multiple Walsh sequences on the signaling channel. In another embodiment, the messages for the CDMA signaling channels may have different lengths.

Figure 7:
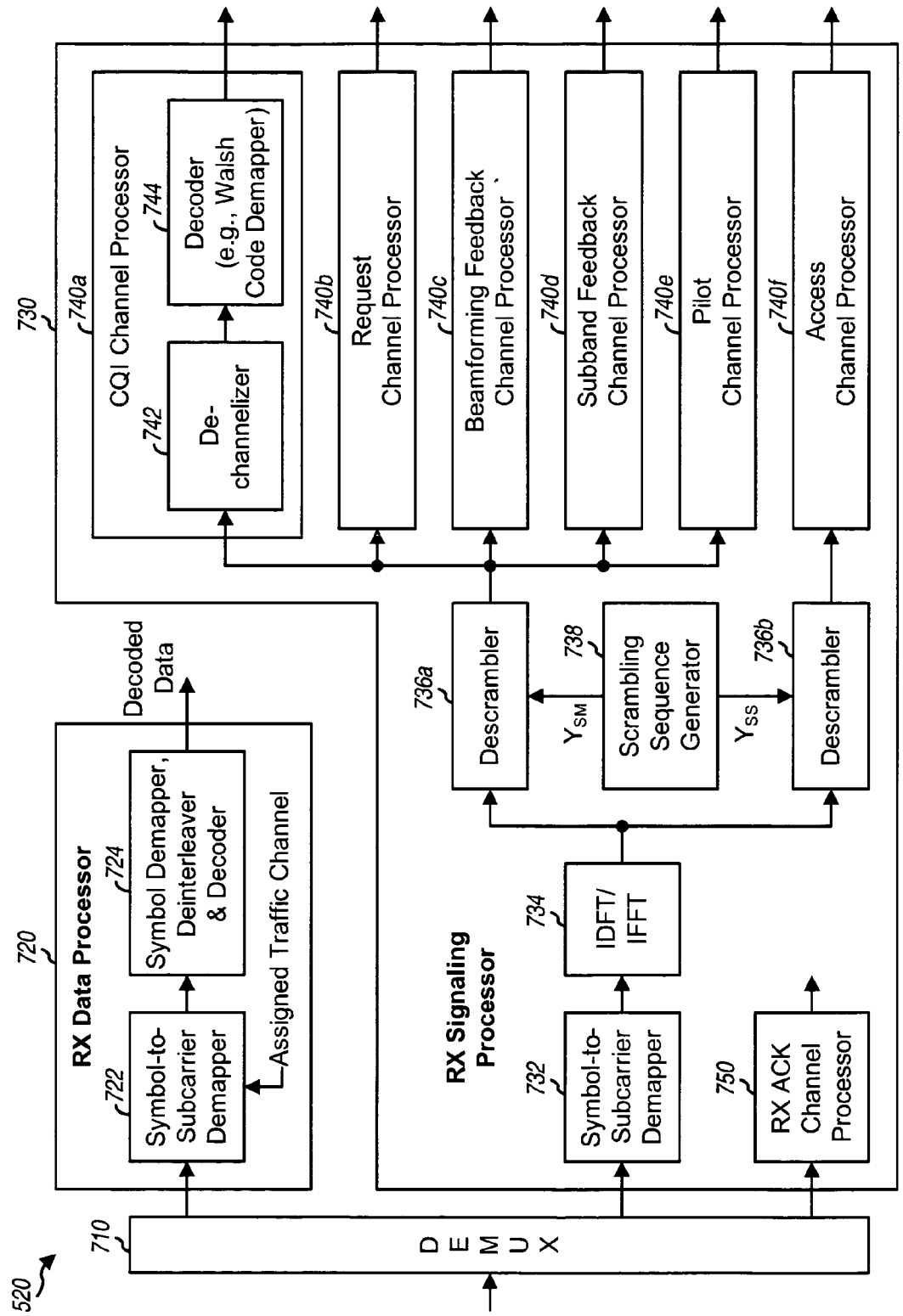
FIG. 7 shows a block diagram of a receive data and signaling processor.

FIG. 7 shows a block diagram of an embodiment of RX data and signaling processor 520 at base station 110 in FIG. 5. Processor 520 includes a demultiplexer (DEMUX) 710, an RX data processor 720, and an RX signaling processor 730. For clarity, the processing to recover traffic data and signaling from one terminal (e.g., terminal 120 in FIG. 5) is described below.

Within RX data processor 720, a symbol-to-subcarrier demapper 722 extracts received symbols from the time-frequency blocks for the traffic channel assigned to terminal 120. A unit 724 symbol demaps, deinterleaves, and decodes the extracted received symbols and provides decoded data for terminal 120.

Within RX signaling processor 730, a symbol-to-subcarrier demapper 732 extracts received symbols from the time-frequency region used for the CDMA control segment in each CDMA frame. For each symbol period in which the CDMA control segment is sent, an IDFT/IFFT unit 734 transforms the received symbols for that symbol period to the time domain and provides received samples. A descrambler 736a descrambles the received samples with the scrambling sequence $Y_{SM}$ provided by a scrambling sequence generator 738 and provides descrambles samples $D_{SM}$ to channel processors 740a through 740e for the CQICH, REQCH, BFCH, SFCH, and PICH. Within channel processor 740a for the CQICH, a de-channelizer 742 multiplies the descrambled samples $D_{SM}$ with the channelization sequence $S_{CQICH}$. A decoder 744 decodes the channelized samples and provides a recovered message for the CQICH. Each of channel processors 740b through 740e similarly multiplies the descrambled samples $D_{SM}$ with the channelization sequence for the associated signaling channel, decodes the channelized samples, and provides a recovered message for that signaling channel. Pilot channel processor 740e may provide a broadband channel estimate that covers all of the subcarriers used for the CDMA control segment. The broadband channel estimate may be used for data detection, scheduling, and so on. A descrambler 736b descrambles the received samples with the scrambling sequence $Y_{SS}$ provided by the scrambling sequence generator 738 and provides descrambles samples $D_{SS}$ for the ACH. A channel processors 740f multiplies the descrambled samples $D_{SS}$ with the channelization sequence for the ACH, decodes the channelized samples, and provides a recovered message for the ACH. An RX ACK channel processor 750 processes received symbols for the ACKCH and provides a detected ACK message.

The pilot channel (PICH) carries a sequence of all ones that is used by the base station to estimate the RL channel response. The RL channel response estimate may be used (1) for adaptive subband scheduling on the reverse link and (2) as an FL channel response estimate in a TDD system in which the FL channel response may be assumed to be reciprocal of the RL channel response.

The access channel (ACH) carries messages or access probes sent by the terminal for system access. The available Walsh sequences for the ACH may be divided into multiple groups. Each group may be associated with specific parameters such as, e.g., buffer level, measured FL signal strength, and so on. A terminal may randomly select a Walsh sequence from a group associated with the desired parameters and may send the selected Walsh sequence to a base station. The terminal may thus communicate the desired parameters to the base station via the selected Walsh sequence.

The ACH may be sent with an extended guard band and guard time in order to prevent intra-sector interference caused by misalignment of the access probe with the CDM control segment boundaries. This timing misalignment may result from the fact that the terminal in the access phase may not have accurate RL timing information.

FIG. 8 shows a process 800 to control signaling transmission on the CDMA control segment. In an embodiment, the CDMA control segment and the CDMA signaling channels are configurable for each sector in the system. Process 800 may be performed by a base station for its sector or by a network entity for a base station. The following description is for one sector.

Transmission parameters for the CDMA control segment for the sector are determined (block 812). These transmission parameters may indicate the size of the CDMA control segment (e.g., the number of subbands or subcarriers for the CDMA control segment), the frames or interlace to use for the CDMA control segment, the frequency hopping for the CDMA control segment, and so on. CDMA signaling channels that are enabled for the sector are also determined (block 814). Which CDMA signaling channels to enable may be dependent on how traffic data is transmitted on the forward and/or reverse link and/or other factors. For example, the SFCH may be disabled if adaptive subband scheduling is not performed for the forward link, and the BFCH may be disabled if beamforming and spatial multiplexing is not performed in an FDD system.

The average transmission interval for each enabled CDMA signaling channel is selected (block 816). The average transmission interval is the average time between successive transmissions of a given signaling channel. The use of an average transmission interval, instead of a fixed transmission interval, provides a terminal with flexibility in determining when to send signaling and further allows for finer granularity in setting the transmission interval.

CDMA signaling channels that are enabled for each terminal are determined and selected from among the enabled CDMA signaling channels for the sector (block 818). The reporting mode to use for each CDMA signaling channel with multiple reporting modes is also determined for each terminal, e.g., based on the transmission scheme (e.g., SISO or MIMO) used for the terminal and/or other factors (also block 818). Control information indicative of various parameters for the CDMA control segment and the enabled CDMA signaling channels is sent to the terminals (block 820). For example, control information that is applicable to all terminals may be broadcast in the FL superframe preamble, and control information that is specific for each terminal may be sent directly to that terminal.

FIG. 8 shows a specific embodiment for controlling the operation of the CDMA control segment. In another embodiment, the average transmission interval is individually selected for each enabled CDMA signaling channel for each terminal. In yet another embodiment, the transmission rate for each enabled CDMA signaling channel is configurable and given by a fixed rate instead of an average rate. The operation of the CDMA control segment may also be controlled in other manners.

FIG. 9 shows an apparatus 900 for controlling signaling transmission on the CDMA control segment. Apparatus 900 includes means for determining transmission parameters (e.g., the size, interlace, and frequency hopping) for the CDMA control segment for a sector (block 912), means for determining CDMA signaling channels that are enabled for the sector (block 914), means for selecting the average transmission interval for each enabled CDMA signaling channel (block 916), means for determining CDMA signaling channels that are enabled for each terminal (block 918), and means for sending control information indicative of various parameters for the CDMA control segment and the enabled CDMA signaling channels to the terminals (block 920).

Figures 10, 11:
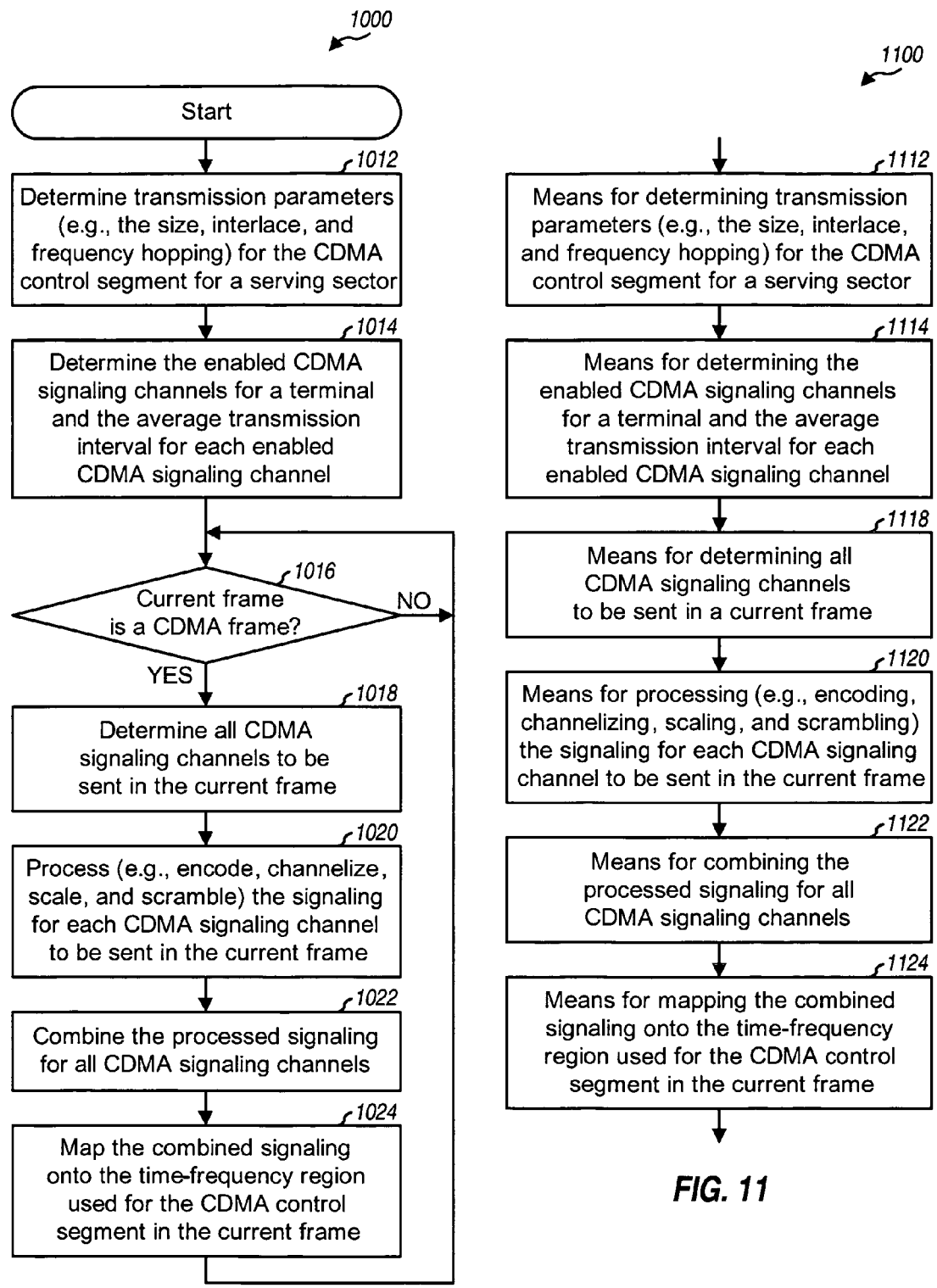
FIGS. 10 and 11 show a process and an apparatus, respectively, for sending signaling on the CDMA control segment.

FIG. 10 shows a process 1000 performed by a terminal for sending signaling on the CDMA control segment. Initially, transmission parameters (e.g., the size, interlace, and frequency hopping) for the CDMA control segment for a serving sector are determined (block 1012). The enabled CDMA signaling channels for the terminal and the average transmission interval for each enabled CDMA signaling channel are determined (block 1014).

For each frame, a determination is made whether the CDMA control segment is being sent in that frame (block 1016). If the answer is 'Yes', then all CDMA signaling channels to be sent in the current frame are determined (block 1018). This determination may be made based on the average transmission intervals for the enabled CDMA signaling channels, whether there is signaling to send for each enabled CDMA signaling channel, and so on. The signaling for each CDMA signaling channel to be sent in the current frame is processed (e.g., encoded, channelized, scaled, and scrambled) (block 1020). The processed signaling for all CDMA signaling channels is combined (block 1022) and the combined signaling is mapped to a time-frequency region used for the CDMA control segment in the current frame (block 1024).

FIG. 11 shows an apparatus 1100 for sending signaling on the CDMA control segment. Apparatus 1100 includes means for determining transmission parameters (e.g., the size, interlace, and frequency hopping) for the CDMA control segment for a serving sector (block 1112) and means for determining the enabled CDMA signaling channels for a terminal and the average transmission interval for each enabled CDMA signaling channel (block 1114).

Apparatus 1100 further includes means for processing each frame in which the CDMA control segment is sent, which includes means for determining CDMA signaling channels to be sent in a current frame (block 1118), means for processing (e.g., encoding, channelizing, scaling, and scrambling) the signaling for each CDMA signaling channel to be sent in the current frame (block 1120), means for combining the processed signaling for all CDMA signaling channels (block 1122), and means for mapping the combined signaling to a time-frequency region used for the CDMA control segment in the current frame (block 1124).

Figure 12:
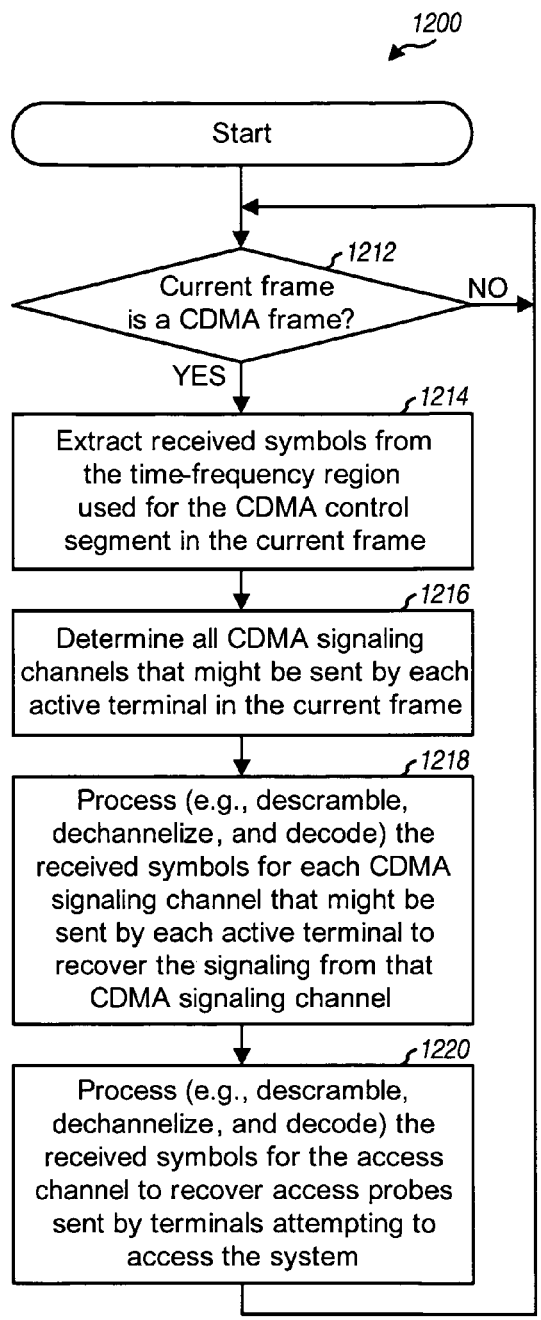
FIGS. 12 and 13 show a process and an apparatus, respectively, for receiving signaling sent on the CDMA control segment.

FIG. 12 shows a process 1200 performed by a base station for receiving signaling sent on the CDMA control segment. For each frame, a determination is made whether the CDMA control segment is being sent in that frame (block 1212). If the answer is 'Yes', then received symbols are extracted from a time-frequency region used for the CDMA control segment in the current frame (block 1214).

For each active terminal, which is a terminal that may send signaling using the sector-specific and user-specific scrambling sequence $Y_{SM}$, all CDMA signaling channels that might be sent by the active terminal in the current frame are determined (block 1216). The received symbols are processed (e.g., descrambled, dechannelized, and decoded) for each CDMA signaling channel that might be sent by each active terminal to recover signaling, if any, from that CDMA signaling channel (block 1218). The received symbols are also processed (e.g., descrambled, dechannelized, and decoded) for the access channel to recover any access probes sent by terminals attempting to access the system (block 1220).

Figure 13:
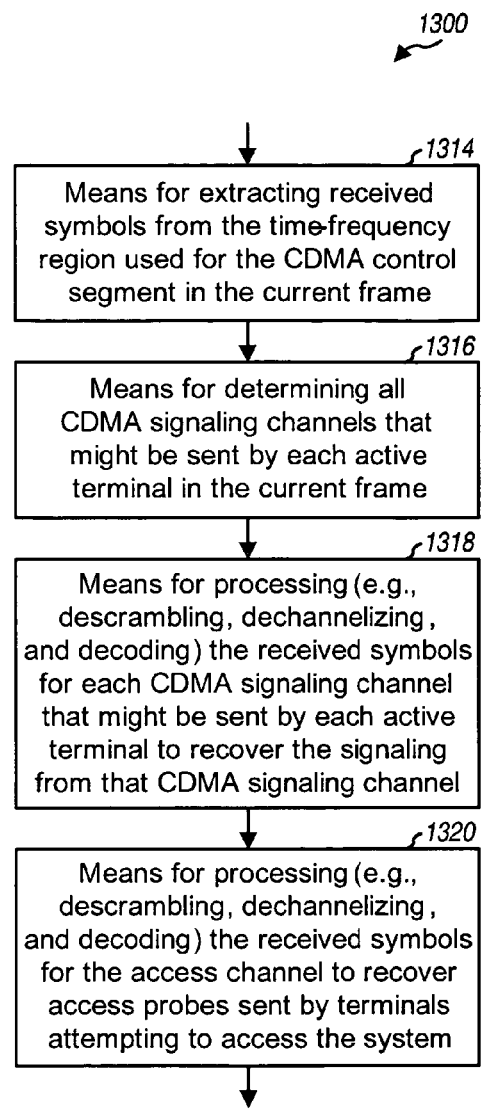

FIG. 13 shows an apparatus 1300 for receiving signaling sent on the CDMA control segment. Apparatus 1300 includes means for processing each frame in which the CDMA control segment is sent, which includes means for extracting received symbols from a time-frequency region used for the CDMA control segment in a current frame (block 1314), means for determining CDMA signaling channels that might be sent by each active terminal in the current frame (block 1316), means for processing (e.g., descrambling, dechannelizing, and decoding) the received symbols for each CDMA signaling channel that might be sent by each active terminal to recover signaling, if any, from that CDMA signaling channel (block 1318), and means for processing (e.g., descrambling, dechannelizing, and decoding) the received symbols for the access channel to recover any access probes sent by terminals attempting to access the system (block 1320).

The signaling transmission techniques described herein may be implemented by various means. For example, these techniques may be implemented in hardware, firmware, software, or a combination thereof. For a hardware implementation, the processing units at a terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a base station may also be implemented within one or more ASIC, DSPs, processors, and so on. Processor 530 may implement process 800 in FIG. 8, processor 560 may implement process 1000 in FIG. 10, and processor 520 may implement process 1200 in FIG. 12.

For a firmware and/or software implementation, the techniques may be implemented with modules (e.g., procedures, functions, and so on) that perform the functions described herein. The software codes may be stored in a memory (e.g., memory 532 or 572 in FIG. 5) and executed by a processor (e.g., processor 530 or 570). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to determine frames in which a control segment is sent and, for each frame in which the control segment is sent, to process signaling for signaling channels, if any, to be sent on the control segment in the frame, and to map the processed signaling to a time-frequency region used for the control segment in the frame, wherein signaling from multiple terminals are sent on the control segment with code division multiple access (CDMA) and wherein the time-frequency region comprises OFDM symbols; and
a memory coupled to the at least one processor.

2. The apparatus of claim 1, wherein the control segment is sent in every Q frames, where Q is an integer greater than one.

3. The apparatus of claim 1, wherein the control segment spans an entire frame for each frame in which the control segment is sent.

4. The apparatus of claim 1, wherein each frame covers multiple subbands, and wherein the control segment has a configurable size and is sent in an integer number of subbands.

5. The apparatus of claim 1, wherein for each of the signaling channels the at least one processor is configured to encode a message for the signaling channel to obtain a coded message, and to channelize the coded message with a channelization code for the signaling channel.

6. The apparatus of claim 5, wherein for each of the signaling channels the at least one processor is configured to encode the message for the signaling channel by mapping the message to one of a plurality of Walsh sequences.

7. The apparatus of claim 5, wherein for each of the signaling channels the at least one processor is configured to generate the channelization code for the signaling channel based on an index for the signaling channel and an identifier for a base station intended to receive the signaling channel.

8. The apparatus of claim 1, wherein messages for the signaling channels have equal length.

9. The apparatus of claim 1, wherein the at least one processor is configured to scramble the signaling for the signaling channels with at least one scrambling sequence.

10. The apparatus of claim 9, wherein the at least one processor is configured to generate one of the at least one scrambling sequence based on an identifier for a base station intended to receive the signaling channels.

11. The apparatus of claim 9, wherein the at least one processor is configured to generate one of the at least one scrambling sequence based on an identifier for a terminal sending the signaling channels and an identifier for a base station intended to receive the signaling channels.

12. The apparatus of claim 1, wherein the at least one processor is configured to combine the signaling for the signaling channels, to transform the combined signaling to frequency domain to obtain signaling symbols, and to map the signaling symbols on the time-frequency region used for the control segment in the frame.

13. The apparatus of claim 1, wherein the signaling channels includes a signaling channel carrying channel quality indicator (CQI).

14. The apparatus of claim 13, wherein the at least one processor is configured to send the signaling channel carrying CQI to multiple base stations.

15. The apparatus of claim 1, wherein the signaling channels includes a signaling channel carrying beamforming feedback information.

16. The apparatus of claim 1, wherein the signaling channels includes a signaling channel carrying feedback information indicative of channel quality for at least one subband among multiple subbands.

17. The apparatus of claim 1, wherein the signaling channels includes a signaling channel carrying feedback information for multiple spatial channels of a multiple-input multiple-output (MIMO) channel.

18. The apparatus of claim 1, wherein the at least one processor is configured to determine the signaling channels to be sent on the control segment in the frame based on an average transmission interval for each signaling channel.

19. The apparatus of claim 1, wherein the control segment hops across frequency from frame to frame.

20. The apparatus of claim 1, wherein the at least one processor is configured to determine subcarriers used for a traffic channel, to determine subcarriers allocated for the control segment, and to map the traffic channel to the subcarriers allocated for the control segment if the traffic channel collides with the control segment.

21. The apparatus of claim 1, wherein the time-frequency region comprises at least 8 OFDM symbols and at least 128 sub-carriers.

22. In a wireless communications system, a method comprising:
determining frames in which a control segment is sent; and
for each frame in which the control segment is sent,
processing signaling for signaling channels to be sent on the control segment in the frame, wherein the processing the signaling for the signaling channels comprises mapping a message for each of the signaling channels to a Walsh sequence among a plurality of Walsh sequences, and channelizing the Walsh sequence for each signaling channel with a channelization code for the signaling channel, and
mapping the processed signaling to a time-frequency region used for the control segment in the frame, wherein the time-frequency region comprises OFDM symbols.

23. The method of claim 22, wherein the processing the signaling for the signaling channels comprises generating the channelization code for each signaling channel based on an index for the signaling channel and an identifier for a base station intended to receive the signaling channel.

24. The method of claim 22, wherein the processing the signaling for the signaling channels comprises scrambling the signaling for the signaling channels with at least one scrambling sequence.

25. The method of claim 24, wherein the processing the signaling for the signaling channels comprises generating one of the at least one scrambling sequence based on an identifier for a terminal sending the signaling channels and an identifier for a base station intended to receive the signaling channels.

26. The method of claim 22, wherein the processing the signaling for the signaling channels comprises
combining the signaling for the signaling channels,
transforming the combined signaling to frequency domain to obtain signaling symbols, and
mapping the signaling symbols to the time-frequency region used for the control segment in the frame.

27. The method of claim 22, wherein the time-frequency region comprises at least 8 OFDM symbols and at least 128 sub-carriers.

28. An apparatus comprising:
means for determining frames in which a control segment is sent; and
means for processing each frame in which the control segment is sent, comprising
means for processing signaling for signaling channels to be sent on the control segment in the frame, wherein the means for processing the signaling for the signaling channels comprises
means for mapping a message for each of the signaling channels to a Walsh sequence among a plurality of Walsh sequences, and
means for channelizing the Walsh sequence for each signaling channel with a channelization code for the signaling channel, and
means for mapping the processed signaling to a time-frequency region used for the control segment in the frame, wherein the time-frequency region comprises OFDM symbols.

29. The apparatus of claim 28, wherein the means for processing the signaling for the signaling channels comprises
means for generating the channelization code for each signaling channel based on an index for the signaling channel and an identifier for a base station intended to receive the signaling channel.

30. The apparatus of claim 28, wherein the means for processing the signaling for the signaling channels comprises means for scrambling the signaling for the signaling channels with at least one scrambling sequence.

31. The apparatus of claim 30, wherein the means for processing the signaling for the signaling channels comprises means for generating one of the at least one scrambling sequence based on an identifier for a terminal sending the signaling channels and an identifier for a base station intended to receive the signaling channels.

32. The apparatus of claim 28, wherein the time-frequency region comprises at least 8 OFDM symbols and at least 128 sub-carriers.

33. An apparatus comprising:
at least one processor configured to channelize messages for multiple signaling channels with multiple channelization codes, to generate the multiple channelization codes for the multiple signaling channels based on a pseudo-random number (PN) generator and different seed values for the multiple signaling channels, to scramble the channelized messages with at least one scrambling code, and to map the scrambled messages to a time-frequency region used for a control segment, wherein the time-frequency region comprises OFDM symbols; and
a memory coupled to the at least one processor.

34. The apparatus of claim 33, wherein the at least one processor is configured to generate one of the at least one scrambling sequence based on an identifier for a terminal sending the multiple signaling channels and an identifier for a base station intended to receive the multiple signaling channels.

35. The apparatus of claim 33, wherein the at least one processor is configured to map the messages for the multiple signaling channels to Walsh sequences, and to channelize the Walsh sequences with the multiple channelization codes.

36. The apparatus of claim 33, wherein the multiple signaling channels carry different types of feedback information, and wherein the messages for the multiple signaling channels carry channel quality indicator (CQI), beamforming feedback information, subband feedback information, or a combination thereof.

37. The apparatus of claim 33, wherein the time-frequency region comprises at least 8 OFDM symbols and at least 128 sub-carriers.

38. An apparatus comprising:
at least one processor configured
to determine frames in which a control segment is sent and, for each frame in which the control segment is sent,
to extract received symbols from a time-frequency region used for the control segment in the frame wherein the time-frequency region comprises OFDM symbols,
to determine signaling channels potentially sent by a terminal on the control segment in the frame, wherein signaling from multiple terminals are sent on the control segment with code division multiple access (CDMA), and
to process the received symbols for the potentially sent signaling channels to recover signaling sent by the terminal; and
a memory coupled to the at least one processor.

39. The apparatus of claim 38, wherein the control segment is sent in every Q frames, where Q is an integer greater than one.

40. The apparatus of claim 38, wherein the control segment spans an entire frame for each frame in which the control segment is sent.

41. The apparatus of claim 38, wherein the at least one processor is configured to transform the received symbols to time domain to obtain received samples, and to descramble the received samples with at least one scrambling sequence.

42. The apparatus of claim 41, wherein the at least one processor is configured to generate one of the at least one scrambling sequence based on an identifier for the terminal and an identifier for a base station receiving the control segment.

43. The apparatus of claim 38, wherein for each of the potentially sent signaling channels the at least one processor is configured to perform channelization with a channelization code for the signaling channel to obtain channelized samples, and to decode the channelized samples to recover a message for the signaling channel.

44. The apparatus of claim 43, wherein for each potentially sent signaling channel the at least one processor is configured to map the channelized samples to a Walsh sequence among a plurality of Walsh sequences, and to provide a message associated with the Walsh sequence as a recovered message for the signaling channel.

45. The apparatus of claim 43, wherein for each potentially sent signaling channel the at least one processor is configured to generate the channelization code for the signaling channel based on an index for the signaling channel and an identifier for a base station intended to receive the signaling channel.

46. The apparatus of claim 38, wherein the time-frequency region comprises at least 8 OFDM symbols and at least 128 sub-carriers.

47. A method comprising:
determining frames in which a control segment is sent; and
for each frame in which the control segment is sent,
extracting received symbols from a time-frequency region used for the control segment in the frame, wherein the time-frequency region comprises OFDM symbols,
determining signaling channels potentially sent by a terminal on the control segment in the frame, and
processing the received symbols for the potentially sent signaling channels to recover signaling sent by the terminal, wherein the processing the received symbols for the potentially sent signaling channels comprises transforming the received symbols to time domain to obtain received samples, and descrambling the received samples with at least one scrambling sequence.

48. The method of claim 47, wherein the processing the received symbols for the potentially sent signaling channels comprises, for each potentially sent signaling channel,
performing channelization with a channelization code for the signaling channel to obtain channelized samples,
mapping the channelized samples to a Walsh sequence among a plurality of Walsh sequences, and
providing a message associated with the Walsh sequence as a recovered message for the signaling channel.

49. The method of claim 47, wherein the time-frequency region comprises at least 8 OFDM symbols and at least 128 sub-carriers.

50. An apparatus comprising:
means for determining frames in which a control segment is sent; and
means for processing each frame in which the control segment is sent, comprising
means for extracting received symbols from a time-frequency region used for the control segment in the frame, wherein the time-frequency region comprises OFDM symbols,
means for determining signaling channels potentially sent by a terminal on the control segment in the frame, and
means for processing the received symbols for the potentially sent signaling channels to recover signaling sent by the terminal, wherein the means for processing the received symbols for the potentially sent signaling channels comprises
means for transforming the received symbols to time domain to obtain received samples, and
means for descrambling the received samples with at least one scrambling sequence.

51. The apparatus of claim 50, wherein the means for processing the received symbols for the potentially sent signaling channels comprises, for each potentially sent signaling channel,
means for performing channelization with a channelization code for the signaling channel,
means for mapping channelized samples to a Walsh sequence among a plurality of Walsh sequences, and
means for providing a message associated with the Walsh sequence as a recovered message for the signaling channel.

52. The apparatus of claim 50, wherein the time-frequency region comprises at least 8 OFDM symbols and at least 128 sub-carriers.

53. An apparatus comprising:
at least one processor configured
to determine transmission parameters for a control segment,
to determine signaling channels that are enabled for the control segment, and
to send control information indicative of the transmission parameters for the control segment and the enabled signaling channels for the control segment,
wherein signaling from multiple terminals are sent on the control segment with code division multiple access (CDMA) scheme,
wherein the transmission parameters for the control segment indicate size of the control segment and frames in which the control segment is sent, and
wherein the size of the control segment comprises at least 8 OFDM symbols and 128 sub-carriers; and
a memory coupled to the at least one processor.

54. The apparatus of claim 53, wherein the at least one processor is configured to determine an average transmission interval for each of the enabled signaling channels for the control segment.

55. The apparatus of claim 53, wherein the at least one processor is configured to determine signaling channels that are enabled for each of at least one terminal.

56. A non-transitory computer-readable storage medium comprising code executable by a computer, the non-transitory computer-readable storage medium comprising:
code for causing a computer to determine frames in which a control segment is sent; and
for each frame in which the control segment is sent,
code for causing a computer to process signaling for signaling channels to be sent on the control segment in the frame, wherein the processing the signaling for the signaling channels comprises code for causing a computer to map a message for each of the signaling channels to a Walsh sequence among a plurality of Walsh sequences, and channelize the Walsh sequence for each signaling channel with a channelization code for the signaling channel, and
code for causing a computer to map the processed signaling to a time-frequency region used for the control segment in the frame, wherein the time-frequency region comprises OFDM symbols.

57. A non-transitory computer-readable storage medium comprising code executable by a computer, the non-transitory computer-readable storage medium comprising:
code for causing a computer to determine frames in which a control segment is sent; and
for each frame in which the control segment is sent,
code for causing a computer to extract received symbols from a time-frequency region used for the control segment in the frame, wherein the time-frequency region comprises OFDM symbols,
code for causing a computer to determine signaling channels potentially sent by a terminal on the control segment in the frame, and
code for causing a computer to process the received symbols for the potentially sent signaling channels to recover signaling sent by the terminal, wherein the processing the received symbols for the potentially sent signaling channels comprises code for causing a computer to transform the received symbols to time domain to obtain received samples, and descramble the received samples with at least one scrambling sequence.

* * * * *